United States Patent
Nagami et al.

(10) Patent No.: US 8,462,505 B2
(45) Date of Patent: Jun. 11, 2013

(54) POWER SUPPLY APPARATUS INCLUDING FAN FOR AIR COOLING

(75) Inventors: Kazutoshi Nagami, Osaka (JP);
Toshimitsu Doi, Osaka (JP); Haruhiko Manabe, Osaka (JP); Hirotsune Tajima, Osaka (JP); Tetsuya Etoh, Osaka (JP);
Masayoshi Kureha, Osaka (JP); Isamu Gamou, Osaka (JP)

(73) Assignee: DAIHEN Corporation, Osaka (JP)

( * ) Notice: Subject to any disclaimer, the term of this patent is extended or adjusted under 35 U.S.C. 154(b) by 177 days.

(21) Appl. No.: 13/044,267

(22) Filed: Mar. 9, 2011

(65) Prior Publication Data
US 2011/0222243 A1 Sep. 15, 2011

(30) Foreign Application Priority Data

Mar. 10, 2010 (JP) ................. 2010-053085
Mar. 15, 2010 (JP) ................. 2010-056937
Mar. 29, 2010 (JP) ................. 2010-074438

(51) Int. Cl.
*H05K 7/20* (2006.01)

(52) U.S. Cl.
USPC ...... 361/697; 361/679.47; 361/690; 361/695; 165/80.3; 165/104.33; 165/121; 165/122; 165/185; 454/184; 219/130.1; 219/133

(58) Field of Classification Search
USPC ....... 361/679.46–679.54, 690–697, 704–727; 165/80.3, 104.33, 121–126, 185; 219/130.1, 219/86.31, 137 PS, 137.62, 385, 478, 520, 219/660, 136, 56, 58, 74, 125.1, 125.11, 219/132, 133; 454/184
See application file for complete search history.

(56) References Cited

U.S. PATENT DOCUMENTS

| | | | | |
|---|---|---|---|---|
| 5,121,291 A * | 6/1992 | Cope et al. | | 361/695 |
| 5,438,226 A * | 8/1995 | Kuchta | | 307/125 |
| 5,502,618 A * | 3/1996 | Chiou | | 361/695 |
| 5,624,589 A * | 4/1997 | Latvis et al. | | 219/133 |
| 5,642,260 A * | 6/1997 | Sigl | | 361/695 |
| 5,831,847 A * | 11/1998 | Love | | 363/141 |
| 5,963,887 A * | 10/1999 | Giorgio | | 702/64 |
| 5,977,644 A * | 11/1999 | Smith | | 290/1 B |
| 6,046,921 A * | 4/2000 | Tracewell et al. | | 363/141 |
| 6,418,015 B1 * | 7/2002 | Kociecki | | 361/695 |
| 6,489,591 B1 * | 12/2002 | Achtner | | 219/130.1 |
| 6,515,858 B2 * | 2/2003 | Rodriguez et al. | | 361/695 |
| 6,520,851 B1 * | 2/2003 | Shih | | 454/184 |
| 6,621,700 B1 * | 9/2003 | Roman et al. | | 361/697 |

(Continued)

FOREIGN PATENT DOCUMENTS

| | | |
|---|---|---|
| EP | 0 900 621 | 3/1999 |
| EP | 1 022 085 | 7/2000 |

(Continued)

*Primary Examiner* — Michail V Datskovskiy
(74) *Attorney, Agent, or Firm* — Hamre, Schumann, Mueller & Larson, P.C.

(57) ABSTRACT

A power supply apparatus includes an air path extending longitudinally, a fan that blows air into the air path in a direction intersecting a longitudinal direction of the air path, and a plurality of electronic components arranged in the longitudinal direction. Each of the electronic components is cooled by air passing through the air path. With this configuration, it is possible to efficiently cool the electronic components without compromising the flexibility of arrangement of the various electronic components. Also, a dust removal operation can be readily performed without the possibility of damaging the fan.

24 Claims, 23 Drawing Sheets

U.S. PATENT DOCUMENTS

| | | | |
|---|---|---|---|
| 6,735,078 B2 * | 5/2004 | Tsai | 361/695 |
| 6,831,838 B1 * | 12/2004 | Boyce | 361/719 |
| 6,888,099 B1 * | 5/2005 | Schneider | 219/130.1 |
| 6,925,828 B1 * | 8/2005 | Gerstner et al. | 62/259.2 |
| 7,245,489 B2 * | 7/2007 | Natsume et al. | 361/695 |
| 7,289,320 B2 * | 10/2007 | Chang et al. | 361/690 |
| 7,423,871 B2 * | 9/2008 | Schwab | 361/695 |
| 7,456,373 B2 * | 11/2008 | Andersen et al. | 219/130.1 |
| 7,515,412 B2 * | 4/2009 | Lee | 361/695 |
| 7,573,713 B2 * | 8/2009 | Hoffman et al. | 361/697 |
| 7,771,864 B2 * | 8/2010 | Kiya et al. | 429/62 |
| 7,800,246 B2 * | 9/2010 | Lv et al. | 307/29 |
| 7,800,901 B2 * | 9/2010 | Borowy et al. | 361/690 |
| 8,243,447 B2 * | 8/2012 | Fujiki et al. | 361/695 |
| 2002/0006027 A1 | 1/2002 | Rodriguez et al. | |
| 2005/0030711 A1 * | 2/2005 | Tsai | 361/687 |
| 2007/0215329 A1 * | 9/2007 | Schwab | 165/122 |
| 2007/0247811 A1 * | 10/2007 | Ohmi | 361/697 |
| 2008/0061048 A1 | 3/2008 | Borowy et al. | |

FOREIGN PATENT DOCUMENTS

| | | |
|---|---|---|
| JP | 2008-229644 | 10/2008 |
| JP | 2009-248116 | 10/2009 |
| WO | WO 2007/043195 | 4/1997 |

* cited by examiner

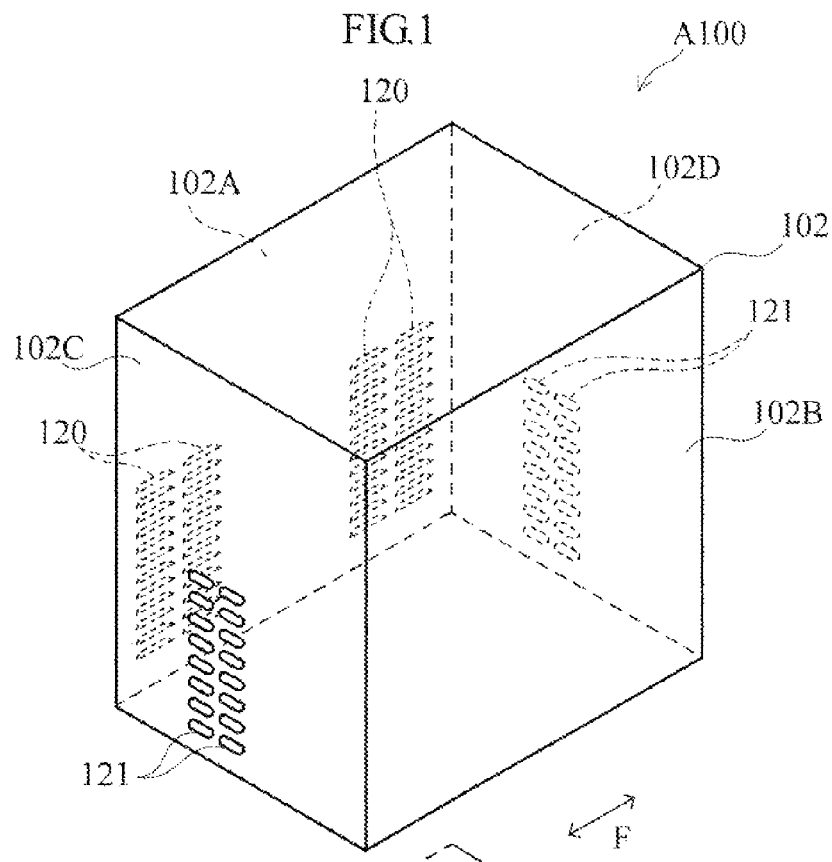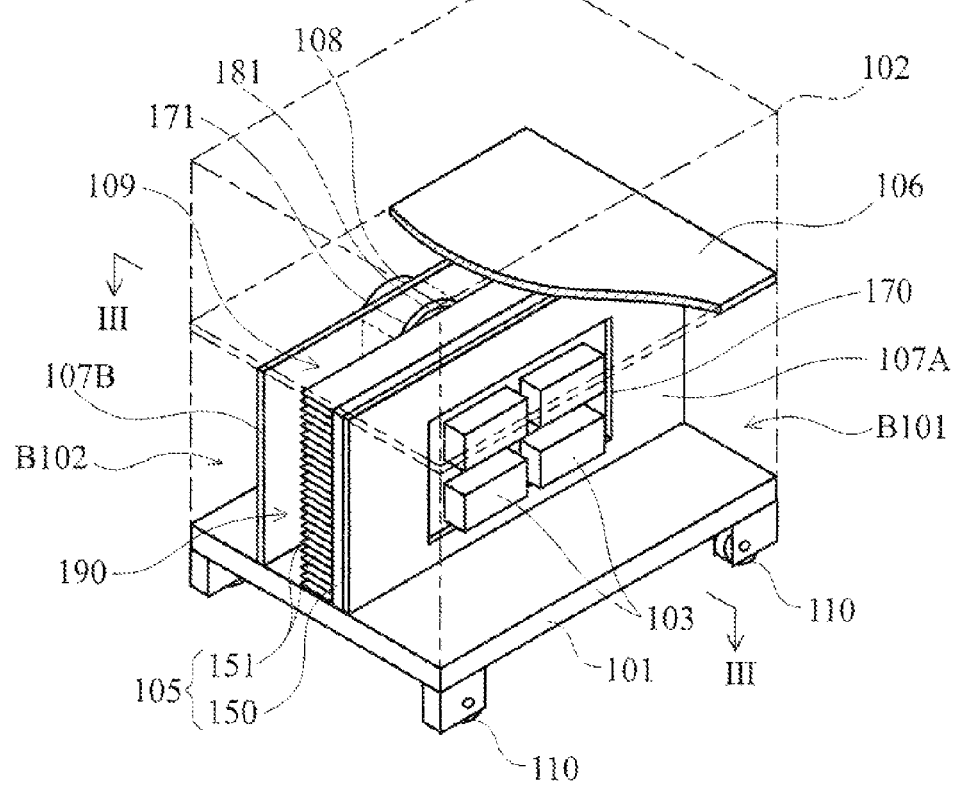

FIG.2
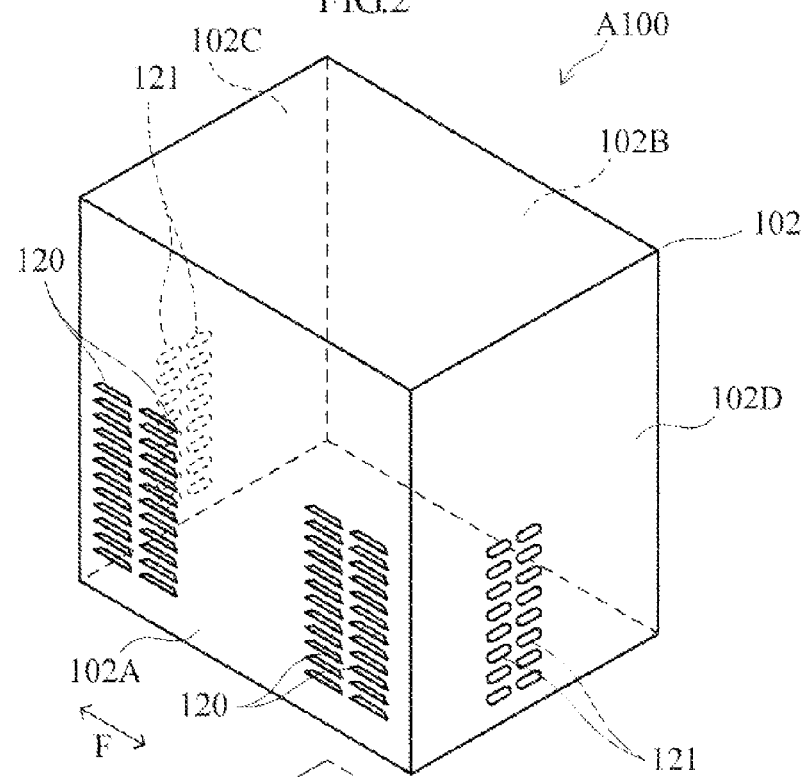
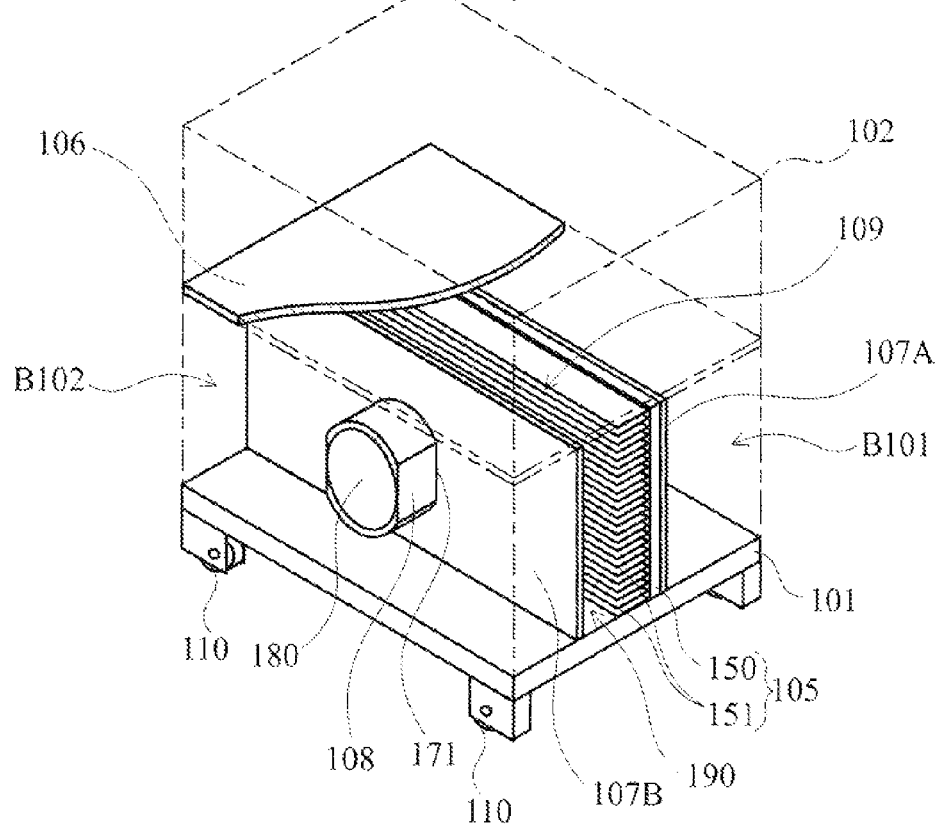

POWER SUPPLY APPARATUS INCLUDING FAN FOR AIR COOLING

BACKGROUND OF THE INVENTION

1. Field of the Invention

The present invention relates, for example, to a welding power supply apparatus, and particularly to a welding power supply apparatus provided with a fan for air cooling.

2. Description of Related Art

JP 2008-229644A discloses an example of a conventional welding power supply apparatus. The power supply apparatus disclosed in the document includes a plurality of electronic components, an air path extending longitudinally, and a fan that blows air draft into this air path. The plurality of electronic components are arranged along a side wall of the air path, and the fan is provided at one end of the air path. Air draft that has been blown into the air path by the fan blows out from an exit provided at the other end of the air path, while drawing heat away from the electronic components. As compared to electronic components that do not tend to generate heat (for example, a chip-type semiconductor device and the like), electronic components that tend to generate heat (for example, a transformer, a reactor, and the like) are arranged closer to the fan such that they can be efficiently air-cooled.

In the case of using such a power supply apparatus in an environment with a lot of dust, such as a factory, dust tends to enter the air path and accumulates inside the air path. For this reason, it is necessary to perform a dust removal operation such as an operation that involves aiming an air blow gun at the interior of the air path from the exit thereof and periodically blowing the dust present inside the air path away by jetting compressed air.

In the case of the above-described conventional power supply apparatus, air draft flows a relatively long distance from one end of the air path to the other end. Therefore, the conventional power supply apparatus has a drawback in that any electronic components located away from the fan cannot be easily cooled. It also has a drawback in that the flexibility of arrangement of electronic components is not very high since a plurality of electronic components that are to be cooled need to be arranged in such a manner that those with a higher likelihood of generating heat are arranged closer to the fan. Moreover, during a dust removal operation, compressed air that has been jetted to the interior of the air path tends to directly strike the fan located at one end of the air path, which may cause the fan to be rotated in reverse at high speed and be damaged.

In addition, the above-described conventional power supply apparatus has only a single air path. When a plurality of electronic components having different heat-generating properties are arranged in that air path, this arrangement significantly affects the temperature and the flow of air draft, resulting in the problem that each of the electronic components cannot be cooled efficiently.

JP 2009-298116A discloses another example of a conventional power supply apparatus. The power supply apparatus disclosed in the document contains, inside a welding power supply portion, an electronic component that is to be cooled, and a fan is provided in a front surface portion of the welding power supply portion. The welding power supply portion is housed in a casing, and thereafter the front surface portion is covered by a front plate. The front plate is provided, at its portion located in front of the fan, with an opening for introducing outside air. With this power supply apparatus, the opening is located in front of the fan, and therefore dust floating in the vicinity of the opening can easily be sucked in by the fan, resulting in the problem that dust can easily enter the welding power supply portion.

SUMMARY OF THE INVENTION

The present invention has been conceived under the foregoing circumstances. Therefore, it is an object of the invention to provide a power supply apparatus capable of solving or mitigating the above-described conventional problems.

According to a first aspect of the present invention, there is provided a power supply apparatus including: an air path extending longitudinally; a fan that blows air into the air path in a direction intersecting a longitudinal direction of the air path; and a plurality of electronic components arranged in the longitudinal direction, wherein each of the electronic components is cooled by air passing through the air path.

Preferably, the fan is arranged in an intermediate portion of the air path in the longitudinal direction, and two ends of the air path in the longitudinal direction each serve as an exit for air draft.

Preferably, the power supply apparatus further includes a heat sink facing the air path, wherein the heat sink is located between the air path and each of the plurality of electronic components.

Preferably, the heat sink includes a plurality of fins each extending in the longitudinal direction, and the plurality of fins are aligned with each other with gaps therebetween.

Preferably, the power supply apparatus further includes: a first wall in which an opening facing the air path is formed; a second wall opposed to the first wall in a first direction that is orthogonal to the longitudinal direction; and a pair of third walls opposed to each other in a second direction that is orthogonal to both the longitudinal direction and the first direction, wherein the air path is surrounded by the first wall, the second wall, and the pair of third walls, the plurality of electronic components are arranged along the second wall, and the fan blows air into the air path through the opening.

Preferably, one of the plurality of electronic component is arranged outside the air path.

Preferably, one of the plurality of electronic components extends through one of the first wall, the second wall, and the pair of third walls.

Preferably, one of the plurality of electronic components is a reactor or a transformer and include a coil portion exposed to the air path.

According to a second aspect of the present invention, there is provided a power supply apparatus including: an air path; a fan that includes a suction port and a discharge port and that blows air into the air path from the discharge port; a plurality of electronic components that are cooled by air passing through the air path; and a plurality of walls, wherein a space that is surrounded by the plurality of walls and that is adjacent to the air path is defined, the plurality of walls include a fan-opposed wall opposed to the suction port, an intake port portion for guiding air outside the space into the space is formed in the fan-opposed wall, and the intake port portion is located in an area displaced, in an in-plane direction of the fan-opposed wall, relative to an area of the fan-opposed wall that is in front of the suction port.

Preferably, the fan-opposed wall constitutes a casing cover for protecting the interior of the apparatus.

Preferably, the air path extends longitudinally, the discharge port faces an intermediate portion of the air path in a longitudinal direction of The air path, the fan-opposed wall is parallel to the longitudinal direction, and the intake port portion is located in an area near an end of the fan-opposed wall in the longitudinal direction.
}

Preferably, the intake port portion is located in a vertically intermediate portion of the fan-opposed wall or an area near a vertically upper portion of the fan-opposed wall.

Preferably, the power supply apparatus further includes: a front surface portion located at one end of the air path in the longitudinal direction; and a rear surface portion located at the other end of the air path in the longitudinal direction, wherein a ventilating hole portion in communication with the air path is formed in each of the front surface portion and the rear surface portion.

Preferably, the power supply apparatus further includes: a first wall in which an opening facing the air path is formed; a second wall opposed to the first wall in a first direction that is orthogonal to the longitudinal direction; and a pair of third walls opposed to each other in a second direction that is orthogonal to both the longitudinal direction and the first direction, wherein the air path is surrounded by the first wall, the second wall, and the pair of third walls, the plurality of electronic components are arranged along the second wall, and the fan blows air into the air path through the opening.

Preferably, one of the plurality of electronic component is arranged outside the air path.

Preferably, one of the plurality of electronic components extends through one of the first wall, the second wall, and the pair of third walls.

Preferably, one of the plurality of electronic components is a reactor or a transformer and include a coil portion exposed to the air path.

According to a third aspect of the present invention, there is provided a power supply apparatus including: a first air path; a first fan that blows air into the first air path; a second air path separated from the first air path; a second fan that blows air into the second air path; and a plurality of electronic components that are each cooled by air passing through the first air path or air passing through the second air path.

Preferably, the power supply apparatus further includes a parting plate interposed between the first air path and the second air path, wherein the first air path extends longitudinally, and the second air path extends longitudinally in a longitudinal direction of the first air path.

Preferably, the second air path is located above the first air path, and has an air volume larger than that of the first fan.

Preferably, the power supply apparatus further includes: a first wall in which a first opening facing the first air path is formed; a second wall opposed to the first wall in a first direction that is orthogonal to the longitudinal direction; a third wall in which a second opening facing the second air path is formed; and a fourth wall opposed to the third wall in the first direction, wherein two ends of both the first air path and the second air path in the longitudinal direction each serve as an exit for air draft, the first fan is located in an intermediate portion of the first air path in the longitudinal direction and blows air into the first air path through the first opening, and the second fan is located in an intermediate portion of the second air path in the longitudinal direction and blows air into the second air path through the second opening.

Preferably, both the first fan and the second fan discharge air in a direction intersecting the longitudinal direction.

Preferably, the power supply apparatus further includes a fan-opposed wall opposed to both the first fan and the second fan, wherein both the first fan and the second fan are arranged in a space adjacent to both the first air path and the second air path, an intake port portion for guiding air outside the space into the space is formed in the fan-opposed wall, and the intake port portion is located in an area displaced, in an in-plane direction of the fan-opposed wall, relative to both an area of the fan-opposed wall that is in front of the first fan and an area of the fan-opposed wall that is in front of the second fan.

Preferably, the intake port portion is located in a vertically intermediate portion of the fan-opposed wall or an area near a vertically upper portion of the fan-opposed wall.

Preferably, the power supply apparatus further includes: a front surface portion located at one end of the first air path in the longitudinal direction and at one end of the second air path in the longitudinal direction; and a rear surface portion located at the other end of the first air path in the longitudinal direction and at the other end of the second air path in the longitudinal direction, wherein a ventilating hole portion is formed in each of the front surface portion and the rear surface portion.

Preferably, the power supply apparatus further includes a heat sink, wherein one of the plurality of electronic components is a reactor or a transformer and include a coil portion exposed to the first air path, the heat sink is exposed to the second air path, and one of the plurality of electronic components extends through the fourth wall and are in contact with the heat sink.

Preferably, the power supply apparatus further includes: a first temperature sensor for detecting an internal temperature of the first air path; and a second temperature sensor for detecting an internal temperature of the second air path, wherein the first fan is controlled independently of the second fan in accordance with a signal from the first temperature sensor, and the second fan is controlled independently of the first fan in accordance with a signal from the second temperature sensor.

The other features and advantages of the present invention will become clearer based on the ensuing detailed explanation with reference to the attached drawings.

BRIEF DESCRIPTION OF THE DRAWINGS

FIG. 1 is an exploded perspective view showing one embodiment of a power supply apparatus according to the present invention.

FIG. 2 is an exploded perspective view showing the power supply apparatus in FIG. 1 from a different angle.

DETAILED DESCRIPTION OF THE PREFERRED EMBODIMENTS

Figure 3:
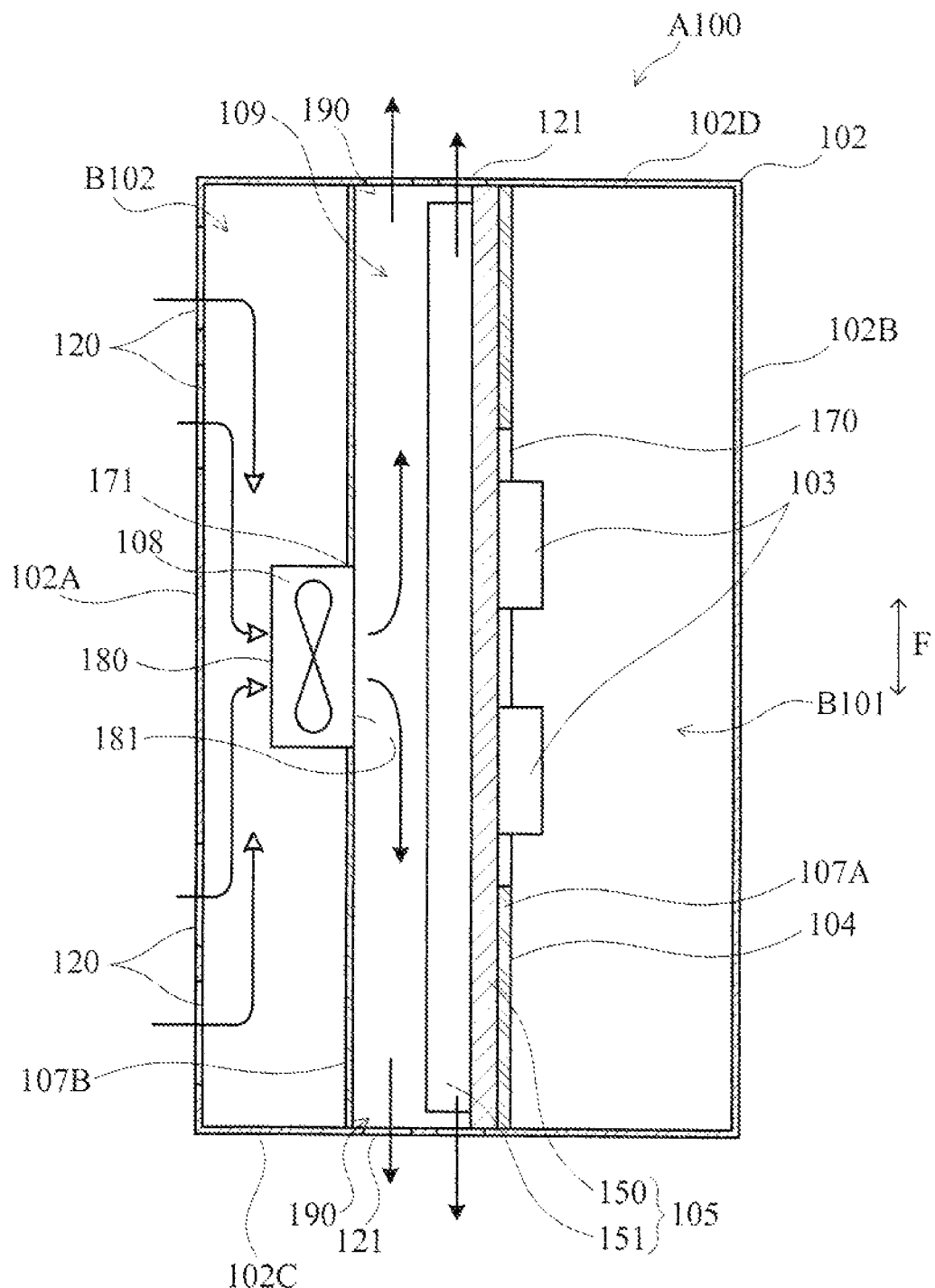
FIG. 3 is a cross-sectional view taken along line III-III in FIG. 1.

FIGS. 1 to 3 show one embodiment of a power supply apparatus. A power supply apparatus A100 of this embodiment is used, for example, for outputting large current and high voltage necessary for arc welding. The power supply apparatus A100 is used in, for example, an environment with a lot of dust, such as a factory.

The power supply apparatus A100 includes a base member 101, a casing cover 102, various electronic components 103 constituting a power circuit, a heat sink 105, a first parting plate 106, two second parting plates 107A and 107B, and a cooling fan 108. Inside the apparatus, a hollow air path 109 is provided that is surrounded by part of the base member 101, part of the first parting plate 106, and the second parting plates 107A and 107B. The air path 109 extends longitudinally in the front-rear direction of the power supply apparatus A100 (hereinafter, referred to as "F direction"). Additionally, a layout space B101 for the electronic components 103 and a layout space B102 for the fan 108 that are surrounded by part of the base member 101, part of the casing cover 102, part of the first parting plate 106, and the second parting plates 107A and 107B are provided in the apparatus outward of the air path 109.

The base member 101 is an elongated rectangular plate member that is elongated in the F direction. A plurality of wheels 110 are pivotally attached to the under surface of the base member 101 via brackets. The wheels 110 allow the base member 101 to move on a floor surface. In a central portion of the top surface of the base member 101, the second parting plates 107A and 107B are arranged so as to be opposed to each other with a predetermined interval.

The casing cover 102 is made of, for example, metal and serves to protect the interior of the apparatus. The casing cover 102 has the shape of a box that is removable from the base member 101, and includes two side surface portions 102A and 102B forming vertical planes along two lateral sides of the base member 101, and a front surface portion 102C and a rear surface portion 102D forming vertical planes along the front end and the rear end, respectively, of the base member 101. Intake port portions 120 for guiding outside air into the layout space B102 for the fan 108 are provided in areas near two ends, in the F direction, of one of the side surface portions, namely, the side surface portion 102A. The intake port portions 120 are each formed by many slit holes having a relatively small size. The areas of the front surface portion 102C and the rear surface portion 102D that correspond to the air path 109 are each provided with ventilating hole portions 121 for guiding air draft from the air path 109 to the outside. The ventilating hole portions 121 are each formed by many holes having a relatively large size for better ventilation.

The electronic components 103 tend to generate heat during operation, and may be, for example, electronic components constituting a power circuit, such as a switching element, a diode and a capacitor, or also may be other electronic components such as a transformer and a reactor. The electronic components 103 are directly attached to the heat sink 105 through the second parting plate 107A. Accordingly, heat from each of the electronic components 103 is quickly conducted to the heat sink 105.

The heat sink 105 is a heat dissipating member made of, for example, aluminum, and includes a base 150 fixed to the second parting plate 107A, and a plurality of vertically aligned fins 151 extending from the base 150 in the F direction. The electronic components 103 are directly attached via screws (not shown) or the like to part of the base 150 that is opposed to the second parting plate 107A. The plurality of fins 151 are portions that efficiently dissipate the heat conducted from the base 150 into the air, and have an increased surface area to achieve an improved heat dissipating effect. The heat sink 105 has approximately the same size as that of the second parting plate 107A, and a longitudinal dimension extending approximately the entire length of the air path 109. In this embodiment, the heat sink 105 is also cooled. Note that the size of the heat sink may be smaller than that of the second parting plate 107A.

The first parting plate 106 is made of, for example, metal and serves to divide the internal space of the apparatus into an upper space and a lower space. The first parting plate 106 has a rectangular shape having approximately the same size as that of the base member 101, and is horizontally arranged in a vertically intermediate position of the casing cover 102. The first parting plate 106 forms the top wall of the lower space including the layout space B101 for the electronic components 103, the layout space B102 for the fan 108, the air path 109 and the like. Although not shown in the drawings, electronic components and the like are provided in the upper space as well.

The second parting plates 107A and 107B are made of metal, for example, and serves to divide the lower space inside the apparatus into spaces such as the layout space B101 for the electronic components 103, the layout space B102 for the fan 108, and the air path 109. The second parting plates 107A and 107B have a dimension in the F direction that is approximately the same as that of the base member 101, and are arranged perpendicularly to the base member 101 and the first parting plate 106. The second parting plates 107A and 107B form the vertical walls of spaces such as the layout space B101 for the electronic components 103, the layout space B102 for the fan 108, and the air path 109. The second parting plate 107A is provided with a rectangular window 170 for causing part of the base 150 of the heat sink 105 to be exposed to the layout space B101 and allowing the electronic components to be attached to that part. The rectangular window 170 is closed by the base 150. An opening 171 for allowing the fan 108 to face the air path 109 is provided in an intermediate portion in the F direction of the second parting plate 107B (see FIG. 3).

For example, the fan 108 is of the axial flow type where a plurality of blades and an electric motor are integrated, and includes a suction port 180 and a discharge port 181 for air on two axial ends of its electric motor. The fan 108 is arranged such that the discharge port 181 coincides with the opening 171 of the second parting plate 107B. In other words, the fan 108 is arranged in a longitudinally intermediate portion of the air path 109, and the discharge port 181 is located so as to face the air path 109. Consequently, the blowing direction of the fan 108 is a direction intersecting the longitudinal direction of the air path 109 in the horizontal plane. The suction port 180 is located in the layout space B102, and is opposed to the side surface portion 102A with a predetermined interval. Accordingly, the side surface portion 102A is a fan-opposed wall, which is opposed to the suction port 180. The intake port portion 120 is not provided in an area of the side surface portion 102A that is in front of the suction port 180. In other words, the suction port 180 is located a certain distance away from the intake port portions 120 located near two ends of the side surface portion 102A in the F direction.

The air path 109 air-cools the heat sink 105 using air draft from the fan 108, and guides that air draft to its two ends in the longitudinal direction. The air path 109 is surrounded by the second parting plates 107A and 107B serving as a pair of vertical walls that are opposed to each other in the width direction, as well as by part of the first parting plate 106 and part of the base member 101 serving as the top wall and the bottom wall that are vertically opposed to each other, and is formed in a shape having a rectangular cross section. The two ends of the air path 109 in the longitudinal direction each serve as an exit 190 from which air draft blows out. The air draft that has been blown from the fan 108 into the air path 109 strikes the fins 151, and is split into two air streams flowing to the two ends of the air path 109 in the longitudinal direction. Then, the air streams blow out from the exits 190, while drawing a large amount of heat away from the fins 151. In other words, the distance for which the air draft flows from the fan 108 to each of the exits 190 within the air path 109 is about half the overall length of the air path 109, and the air draft is quickly discharged to the outside. This allows the electronic components 103 to be efficiently cooled via the heat sink 105. The air draft blowing out from the exits 190 quickly blows to the outside through the ventilating hole portions 121 provided in the front surface portion 102C and the rear surface portion 102D of the casing cover 102.

Next, the action of the power supply apparatus A100 will be described.

During operation, a plurality of electronic component 103 generate heat as the power supply apparatus A100 outputs large current and high voltage for welding, resulting in an increase in the temperature of the power supply apparatus A100. The heat of each of the electronic components 103 is conducted into the air in the layout space B101, and is also directly conducted to the heat sink 105. At this time, the heat generated in each of the electronic components 103 is efficiently conducted to the heat sink 105 since the metal constituting the material of the heat sink 105 has a higher thermal conductivity than that of the air.

The heat sink 105 has a large surface area in contact with the air because it includes the plurality of fins 151. Therefore, the heat of the heat sink 105 is efficiently dissipated into the air in the air path 109 by the plurality of fins 151.

Upon activation of the fan 108, the air in the layout space B102 is sucked into the suction port 180. When the air in the layout space B102 is sucked into the suction port 180, the pressure in the layout space B102 becomes lower than that of the pressure outside the layout space B102. Then, the air is sucked from the outside of the layout space B102 into the layout space B102 through the intake port portions 120 connecting the layout space B102 with the outside of the layout space B102. Since the power supply apparatus A100 is used in an environment with a lot of dust, the air outside the layout space B102 contains a lot of dust. Therefore, the air that is sucked into the layout space B102 also contains a lot of dust.

The dust-containing air that has been sucked from the intake port portions 120 into the layout space B102 remains in the layout space B102 before flowing into the suction port 180. When the air remains in or flows through the layout space B102, most of the dust present in that air falls. Therefore, the air that is sucked into the suction port 180 contains little dust. Then, the fan 108 can take in the air containing little dust and blow out that air into the air path 109.

The air draft that has been blown from the fan 108 into the air path 109 directly strikes the heat sink 105 and flows along the fins 151 to the two ends of the air path 109 in the longitudinal direction. At that time, the air draft efficiently strikes many fins 151, and therefore a large amount of heat is drawn away from the surface of each of the fins 151. Further, the air draft that has exited from the fan 108 is split into two air streams flowing to the two ends of the air path 109 in the longitudinal direction. These air streams flow a relatively short distance until they are discharged to the outside from the two exits 190. Accordingly, the resistance of the air draft flowing through the air path 109 is reduced, and the air draft is quickly discharged from the exits 190. This allows the heat sink 105 to be efficiently air-cooled, and also enables the electronic components 103 to be efficiently cooled via the heat sink 105.

The fan 108 is located in a longitudinally intermediate portion of the air path 109, as a result of which the plurality of electronic components 103 arranged along the air path 109 are located in the vicinity of the fan 108. In other words, the distance between the fan 108 and each of the electronic components 103 in the longitudinal direction of the air path 109 is shorter than the overall length of the air path 109, and therefore the electronic components 103 are arranged in positions relatively close to the fan 108. This positional relationship between the fan 108 and the electronic components 103 also allows the plurality of electronic components 103 to be efficiently cooled. Accordingly, it is not necessary to determine the positions of the electronic components 103 according to the heat-generating properties of the electronic components 103, and it is therefore possible to arrange the plurality of electronic components 103 with a certain degree of flexibility.

With the power supply apparatus A100, the resistance of the air draft flowing through the air path 109 is reduced, and it is therefore possible to easily decrease the size and the weight of the fan 108, and reduce the noise and the power consumption of the fan 108.

Since a certain amount of dust enters the air path 109 along with the air during operation of the power supply apparatus A100, the apparatus after a relatively long period of use tends to be in a state in which dust has entered the gaps between the fins 151 of the heat sink 105 and has accumulated inside the air path 109. If the power supply apparatus A100 is continuously used in such a state, the heat dissipating effect of the heat sink 105 is reduced, which in turn results in insufficient cooling of the electronic components 103. Consequently, the electronic components 103 may be thermally damaged. For this reason, a dust removal operation, such as an operation that involves periodically blowing away the dust in the air path 109, is performed using an air blow gun (not shown) during operation of the apparatus.

In a dust removal operation using an air blow gun, the casing cover 102 is removed from the base member 101 so as to expose the exits 190 of the air path 109, and compressed air is jetted from, for example, one of the exits 190 of the air path 109, with an air jet nozzle of the air blow gun being aimed at the interior of the air path 109. The compressed air forms a jet following the longitudinal direction of the air path 109, and vigorously blows away, for example, the dust accumulated between the fins 151 to the other exit 190.

Additionally, the jetting direction of the compressed air jetted from the air blow gun is a direction in conformity with the longitudinal direction of the air path 109, or in other words, a direction intersecting the blowing direction of the fan 108. Consequently, the compressed air from the air blow gun forms a jet whose air pressure does not tend to be exerted directly on the blades of the fan 108. Therefore, the fan 108 will not be rotated in reverse at high speed by a strong jet of compressed air during a dust removal operation using the air blow gun, and the blades and the rotational bearings of the fan 108 are thus in no danger of being damaged.

Furthermore, with the power supply apparatus A100, it is possible to suppress the amount of dust entering the air path 109 from the fan 108 along with air draft, and it is therefore not necessary to perform a dust removal operation frequently, making it possible to achieve an increased operating efficiency.

FIGS. 4 to 10 show another embodiment of a power supply apparatus. Note that a power supply apparatus A101 shown in FIGS. 4 to 10 includes upper and lower air paths, each of which is the same as that according to the above-described embodiment. In the following description, components that are identical or similar to those of the above-described embodiment are denoted by identical or similar reference numerals, and the description thereof has been omitted.

The power supply apparatus A101 includes a base member 101, a casing cover 102, electronic components 130 and electronic components 131 constituting a power circuit, a heat sink 105, a first parting plate 106, second parting plates 107A and 107B, a third parting plate 107C, and first and second fan 108 and 108'. Inside the apparatus, a first air path 109 surrounded by a lower part of the second parting plate 107A, the third parting plate 107C and part of the base member 101 is provided, and a second air path 109' surrounded by part of the first parting plate 106, an upper part of the second parting plate 107A, the second parting plate 107B and part of the third parting plate 107C is provided separately from the first air path 109. A layout space B102 for the fans 108 and 108' that is surrounded by part of the base member 101, part of one of the side surface portions of the casing cover 102, namely, the side surface portion 102A, part of the first parting plate 106, the second parting plate 107B and part of the third parting plate 107C is provided in the apparatus outward of the first and second air paths 109 and 109'. The layout space B101 for the electronic components 130 and the like is in communication with a space located above the first parting plate 106

Figure 6:
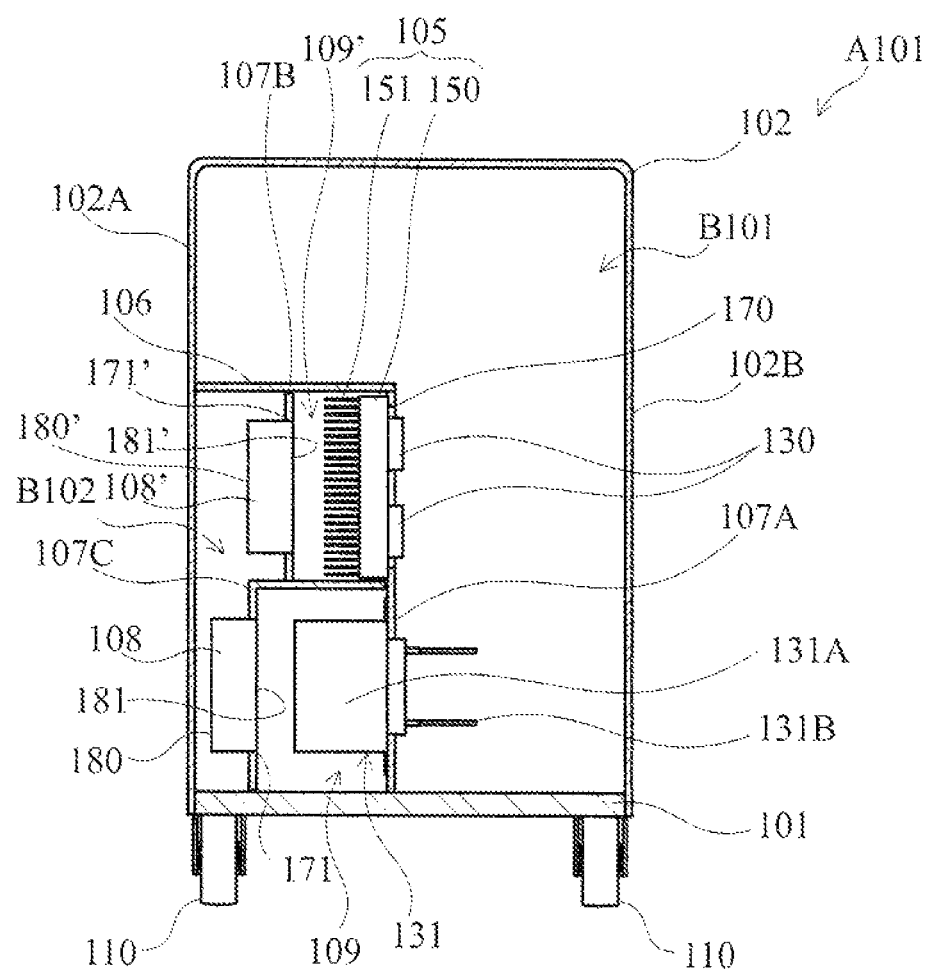
FIG. 6 is a cross-sectional view taken along line VI-VI in FIG. 4.
Figure 7:
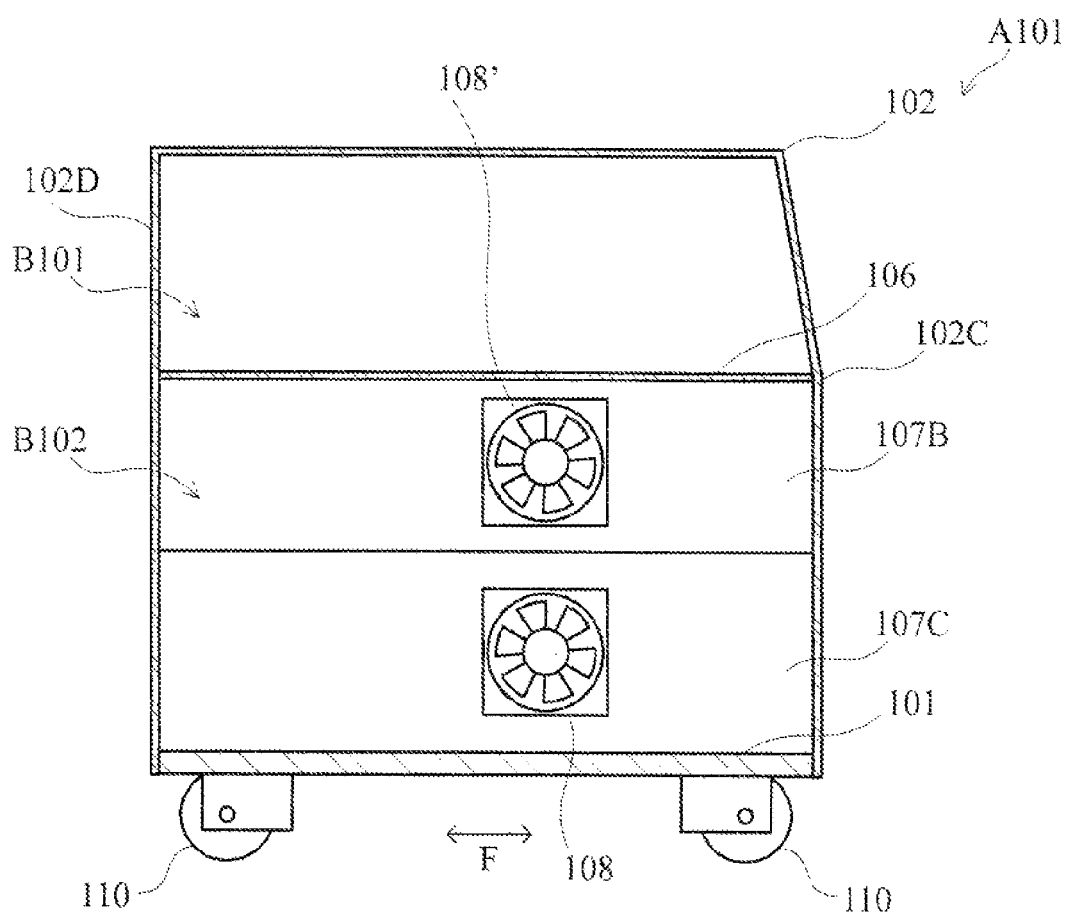
FIG. 7 is a cross-sectional view taken along line VII-VII in FIG. 5.

As shown in FIG. 6, the second parting plate 107A is arranged in the central portion of the top surface of the base member 101, perpendicularly to the top surface. The third parting plate 107C is arranged so as to cover a lower part of one side of the second parting plate 107A and part of the top surface of the base member 101.

Figure 4:
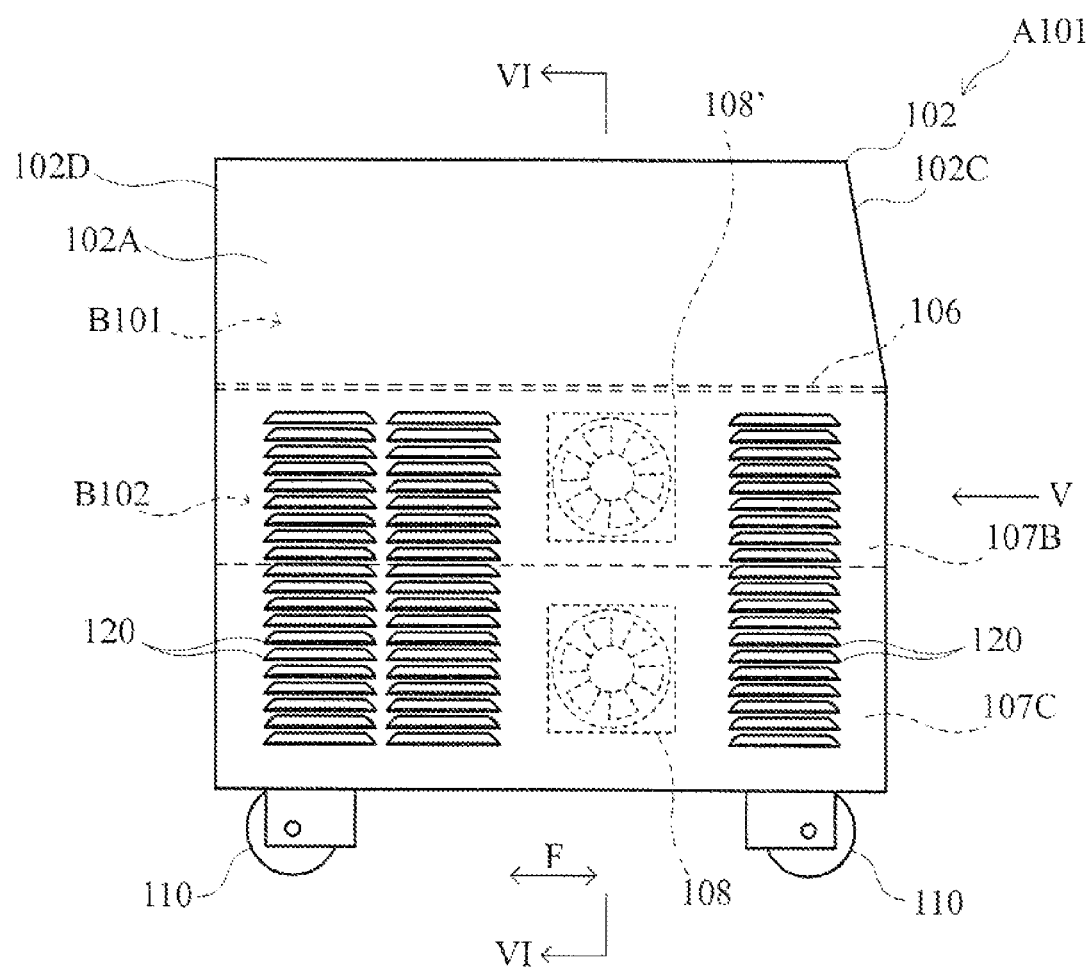
FIG. 4 is a side view showing another embodiment of a power supply apparatus according to the invention.
Figure 5:
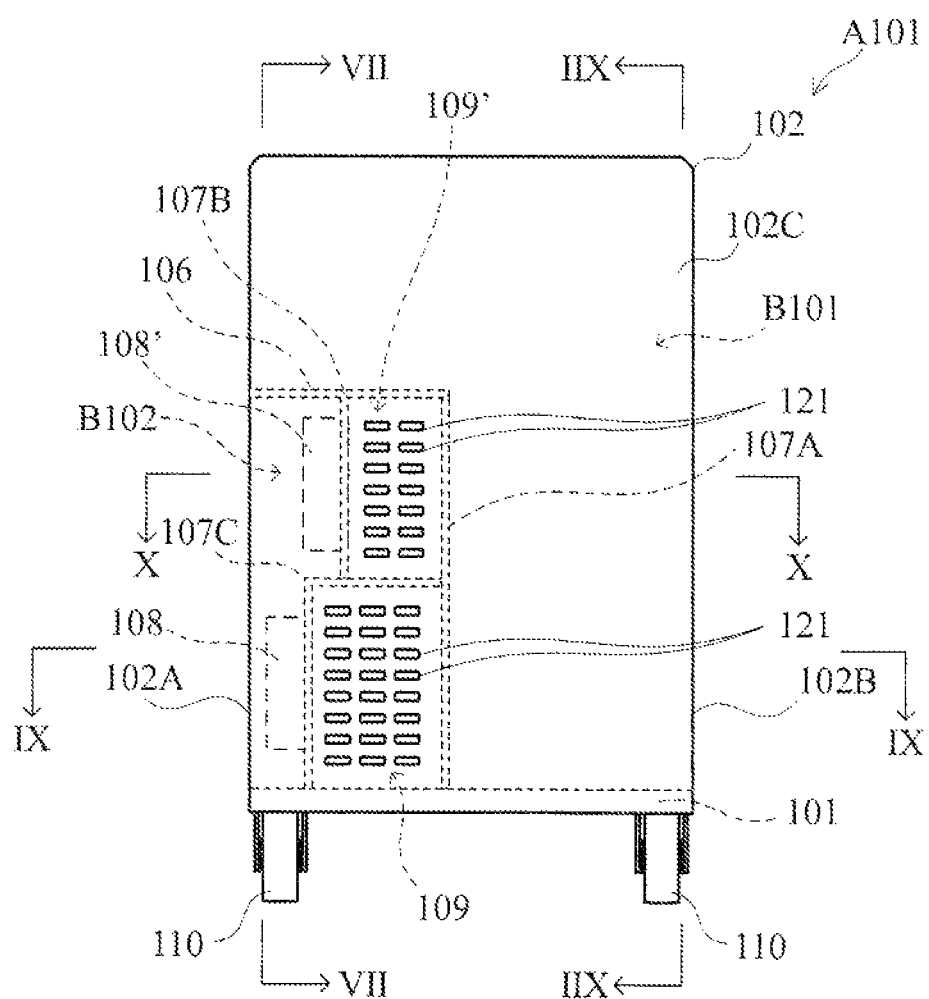
FIG. 5 is a front view of FIG. 4 looking in the direction of arrow V.

As shown in FIG. 4, the side surface portion 102A of the casing cover 102 forms an opposed wall opposing to the first and second fans 108 and 108'. Intake port portions 120 are provided in areas near two ends of the side surface portion 102A in the F direction. The intake port portions 120 are used for guiding outside air into the layout space B102 for the fans 108 and 108', and are each formed by many slit holes having a relatively small size, as in the above-described embodiment. As shown in FIG. 5 as well as FIGS. 9 and 10, the ventilating hole portions 121 are provided in areas of the front surface portion 102C and the rear surface portion 102D that correspond to the first and second air paths 109 and 109'.

Figure 8:
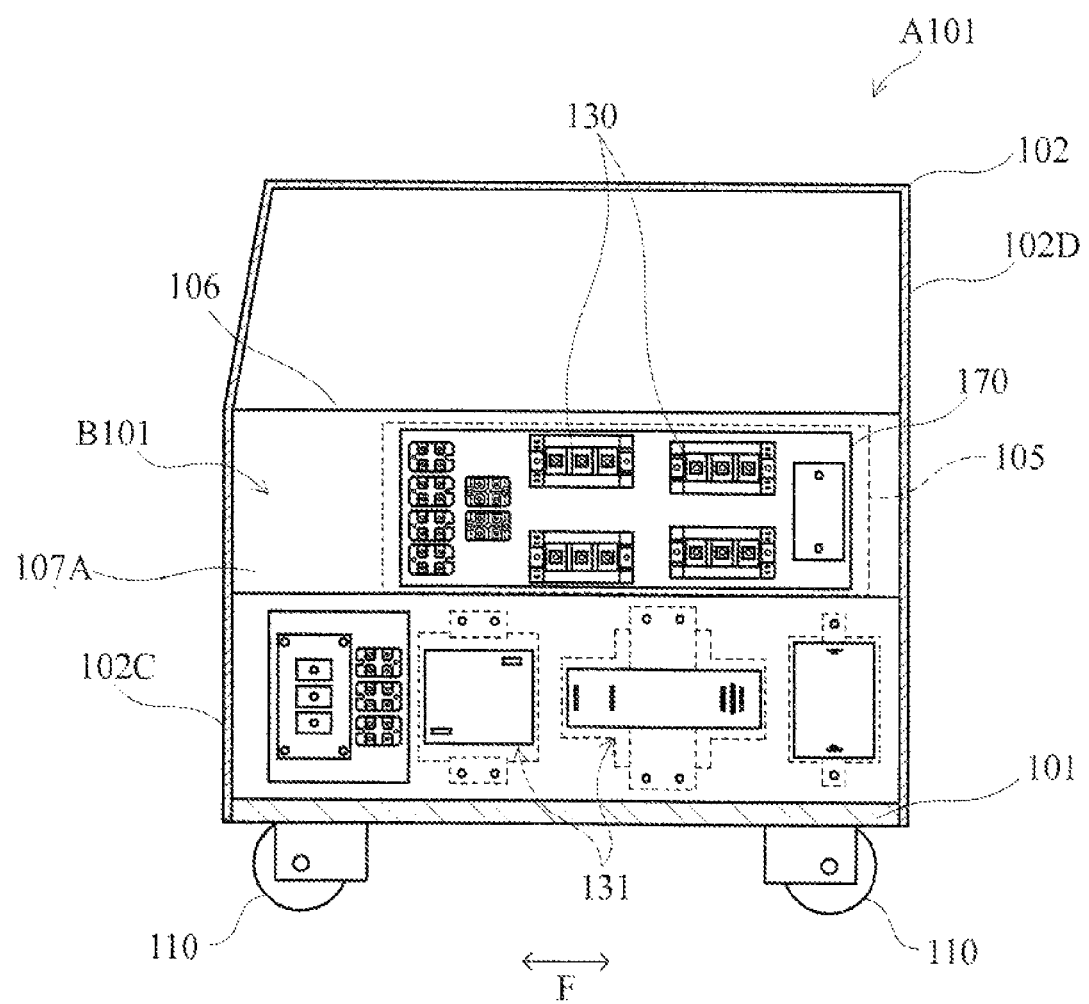
FIG. 8 is a cross-sectional view taken along line IIX-IIX in FIG. 5.
Figure 9:
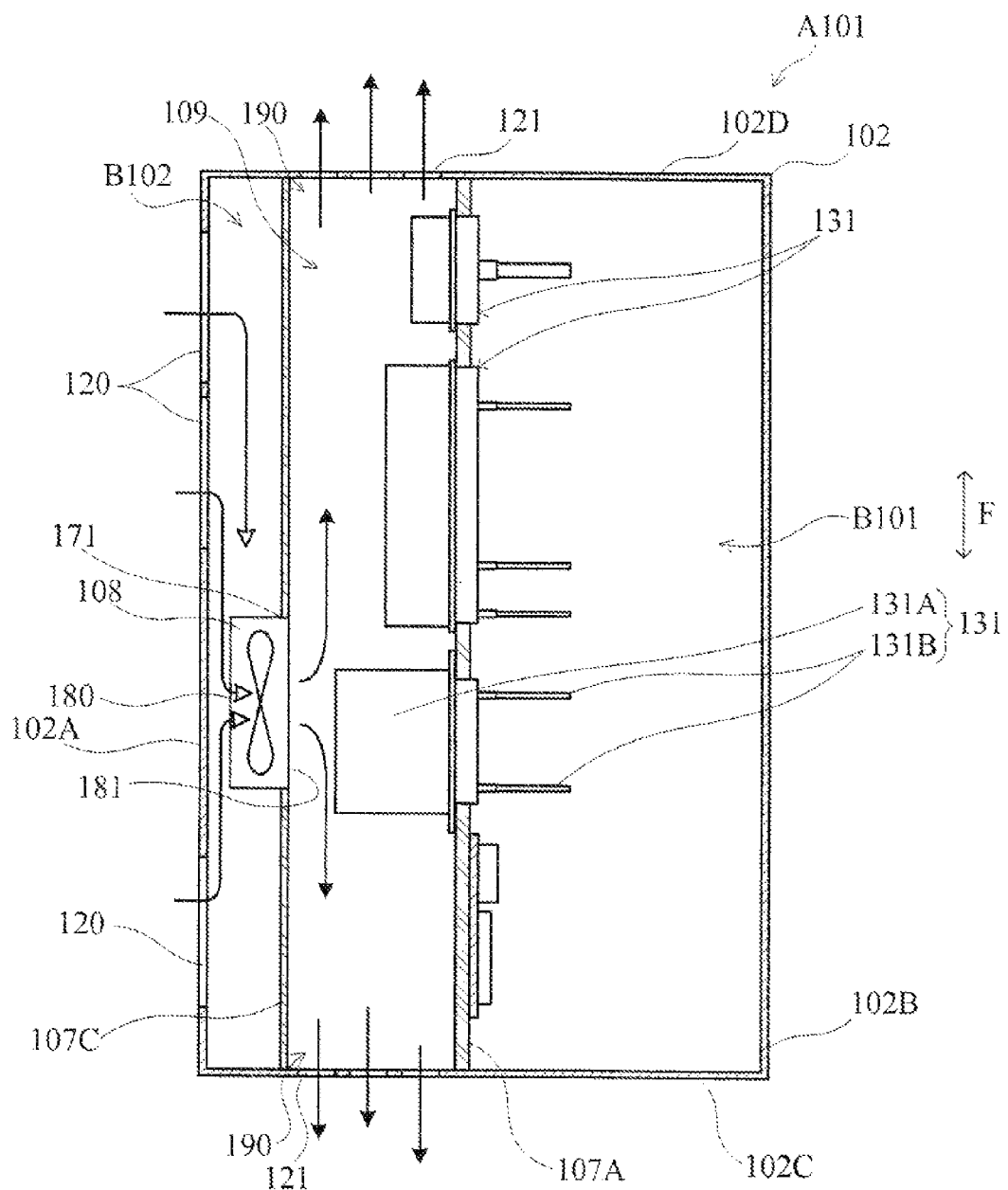
FIG. 9 is a cross-sectional view taken along line IX-IX in FIG. 5.
Figure 10:
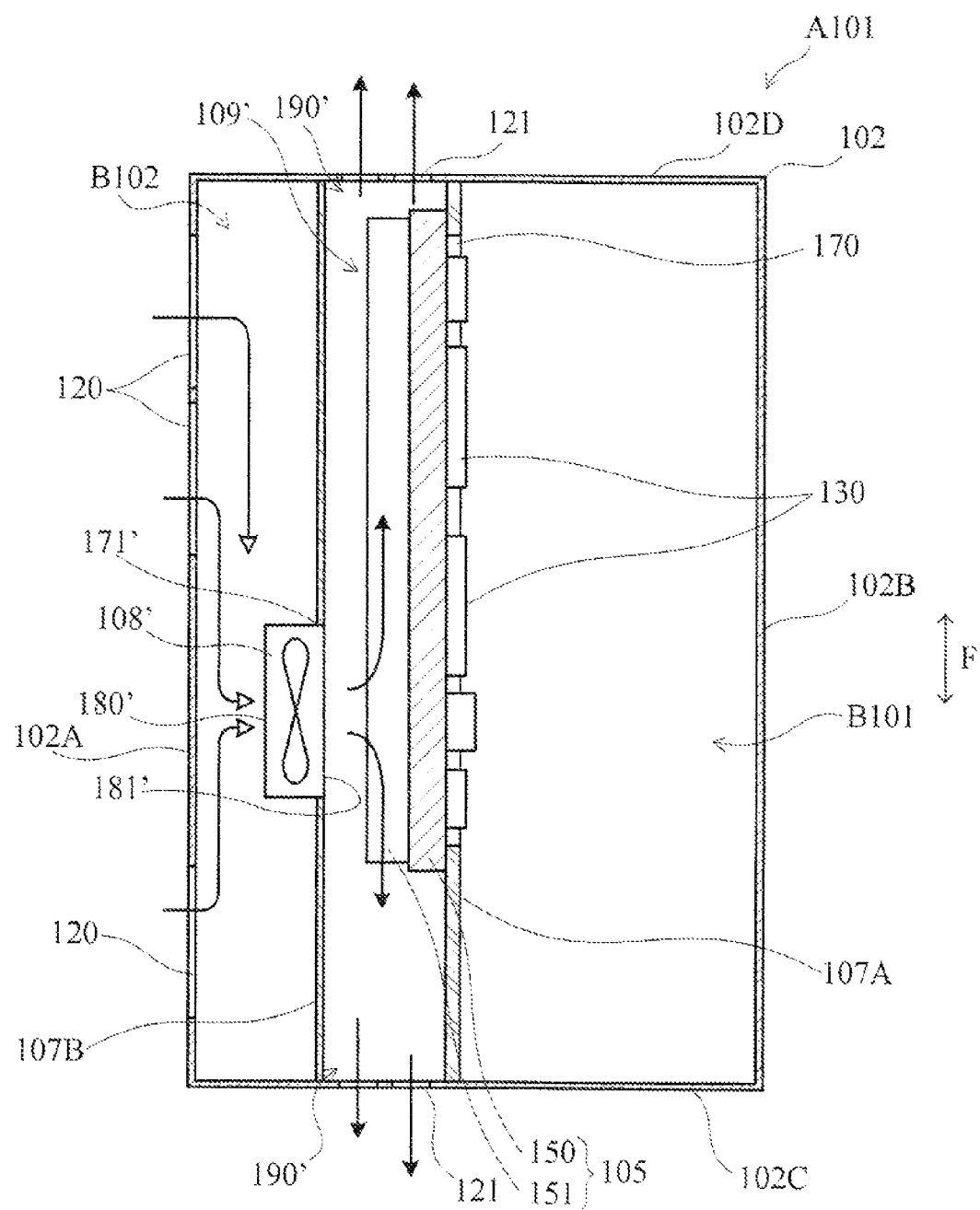
FIG. 10 is a cross-sectional view taken along line X-X in FIG. 5.

As shown in FIG. 10, the electronic components 130 are a switching element, a diode, a capacitor, and the like, and are directly attached to the base 150 of the heat sink 105 via the rectangular window 170 of the second parting plate 107A as in the above-described embodiment. As shown in FIG. 6 and FIG. 8, the electronic components 130 are arranged along an upper part of the second parting plate 107A. As shown in FIG. 9, the electronic components 131 are a transformer, a reactor, and the like, and each includes a coil portion 131A and terminal portions 131B. At least a tip part of each coil portion 131A is located in the first air path 109, and the terminal portions 131B are arranged in the layout space B101 in which the electronic components 130 are likewise arranged. In other words, the electronic components 131 extend through the lower part of the second parting plate 107A, and are arranged so as to face the layout space B101 and the first air path 109. The electronic components 131 used in such a power supply apparatus A101 are relatively large and heavy. Therefore, in order to weight-balance the electronic components 131 during fixing, the electronic components 131 are fixed so as to penetrate the second parting plate 107A, with the amount of the projection of the coil portions 131A facing the first air path 109 being adjusted. Note that the winding of the coil portions 131A of the electronic components 131 may be exposed, or may be sealed with molding resin.

As shown in FIGS. 6 and 10, the heat sink 105 includes a base 150 fixed to the second parting plate 107A, and a plurality of vertically aligned fins 151 extending from the base 150 in the F direction. The electronic components 130 are directly attached via screws (not shown) or the like to one surface of the base 150 that faces the second parting plate 107A. As clearly shown in FIG. 10, the heat sink 105 is formed in a size that is larger than the rectangular window 170 of the second parting plate 107A and has a length in the F direction that is approximately the same as or shorter than the overall length of the air path 109'. In this embodiment as well, the heat sink 105 is cooled. Note that a plurality of heat sinks 105 may be arranged so as to be aligned in the F direction along the second parting plate 107A.

As shown in FIG. 6, the first parting plate 106 vertically separates spaces such as the layout space B102 for the fans 108 and 108' and the second air path 109' from the layout space B101 for the electronic components 130. The first parting plate 106 has approximately the same length in the F direction as that of the base member 101, and one of its ends in the transverse direction is bonded perpendicularly to the upper end of the second parting plate 107A. Consequently, the first parting plate 106 is horizontally located in a vertically intermediate portion of the casing cover 102. The first parting plate 106 forms the top wall of the layout space B102 for the fans 108 and 108' and the second air path 109'.

The second parting plate 107A serves to separate the first and second air paths 109 and 109' from the layout space B101. The second parting plate 107A also has a dimension in the F direction that is approximately the same as that of the base member 101, and is arranged perpendicularly to the base member 101 and the first parting plate 106. In other words, the second parting plate 107A forms a vertical wall of the first and second air paths 109 and 109'. The upper part of the second parting plate 107A is provided with a rectangular window 170 for causing part of the base 150 of the heat sink 105 to be exposed to the layout space B101 and allowing the electronic components 130 to be attached to that part. The rectangular window 170 is closed by the base 150. An opening through which the electronic components 131 can be fitted is formed in a lower part of the second parting plate 107A (reference numeral is omitted).

The second parting plate 107B serves to separate the second air path 109' from the layout space B102. The second parting plate 107B also has approximately the same dimension in the F direction as that of the base member 101. The second parting plate 107B is arranged so as to be opposed to an upper part of the second parting plate 107A, and its upper and lower ends are bonded perpendicularly to the first parting plate 106 and the third parting plate 107C. In other words, the second parting plate 107B forms a vertical wall of the second air path 109'. An opening 171' for allowing the second fan 108' to face the second air path 109' is provided in an intermediate portion in the F direction of the second parting plate 107B (see FIG. 10).

The third parting plate 107C is formed in a shape having an L-shaped cross section so as to surround the first air path 109. The third parting plate 107C as well has approximately the same dimension in the F direction as that of the base member 101. Whereas the tip end of a horizontal part of the third parting plate 107C is bonded perpendicularly to the central part of the second parting plate 107A, the base end of the vertical part is bonded perpendicularly to the base member 101. Consequently, the horizontal part of the third parting plate 107C forms the top wall of the first air path 109 and the bottom wall of the second air path 109', and the vertical part forms a vertical wall of the first air path 109 that is opposed to a lower part of the second parting plate 107A. An opening 171 for allowing the first fan 108 to face the first air path 109 is provided in an intermediate portion in the F direction of the vertical part of the third parting plate 107C (see FIG. 9).

As shown in FIG. 6, the first fan 108 includes a suction port 180 and a discharge port 181 for air. The first fan 108 is arranged such that the discharge port 181 coincides with the opening 171 of the third parting plate 107C. In other words, the first fan 108 is arranged in a longitudinally intermediate portion of the first air path 109, and the discharge port 181 is located so as to face the air path 109. Consequently, the blowing direction of the first fan 108 is a direction intersecting the longitudinal direction of the first air path 109 in the horizontal plane. The suction port 180 is located in the layout space B102, and is opposed to the side surface portion 102A with a predetermined interval. The intake port portion 120 is not provided in an area of the side surface portion 102A that is in front of the suction port 180. In other words, the suction port 180 is located a certain distance away from the intake port portions 120 located near two ends of the side surface portion 102A in the F direction.

As shown in FIG. 6, the second fan 108' includes a suction port 180' and a discharge port 181' for air. The second fan 108' is arranged such that the discharge port 181' coincides with the opening 171' of the second parting plate 107B. In other words, the second fan 108' is arranged in a longitudinally intermediate portion of the second air path 109', and the discharge port 181' is located so as to face the air path 109'. Consequently, the blowing direction of the second fan 108' is a direction intersecting the longitudinal direction of the second air path 109' in the horizontal plane. The suction port 180' is located in the layout space B102, and is opposed to the side surface portion 102A with a predetermined interval. The intake port portion 120 is also not provided in an area of the side surface portion 102A that is in front of the suction port 180'. In other words, the suction port 180' is located a certain distance away from the intake port portions 120 located near two ends of the side surface portion 102A in the F direction.

As shown in FIG. 9, the first air path 109 directly air-cools the electronic components 131 by air draft from the first fan 108, and guides the air draft to two ends in the longitudinal direction. The first air path 109 is surrounded by a lower part of the second parting plate 107A and the vertical part of the third parting plate 107C serving as a pair of vertical walls that are opposed to each other in the width direction, as well as by the horizontal part of the third parting plate 107C and part of the base member 101 serving as the top wall and the bottom wall that are vertically opposed to each other, and is formed in a shape having a rectangular cross section. The two ends of the air path 109 in the longitudinal direction each serve as an exit 190 from which air draft blows out. The air draft that has been blown from the first fan 108 into the first air path 109 directly strikes the coil portions 131A of the electronic components 131, and is split into two air streams flowing to the two ends of the first air path 109 in the longitudinal direction. Then, the air streams blow out from the exits 190, while drawing a large amount of heat away from the coil portions 131A. In other words, the distance for which the air draft flows from the first fan 108 to each of the exits 190 within the first air path 109 is shorter than the overall length of the first air path 109, and the air draft is quickly discharged to the outside. This allows the electronic components 131 to be efficiently air-cooled by air draft flowing through the first air path 109. The air draft blowing out from the exits 190 quickly blows to the outside through the ventilating hole portions 121 provided in the front surface portion 102C and the rear surface portion 102D of the casing cover 102.

As shown in FIG. 10, the second air path 109' air-cools the heat sink 105 using air draft from the second fan 108', and guides that air draft to its two ends in the longitudinal direction. The second air path 109' is surrounded by the upper part of the second parting plate 107A and the second parting plate 107B serving as a pair of vertical walls that are opposed to each other in the width direction, as well as by part of the first parting plate 106 and the horizontal part of the third parting plate 107C serving as the top wall and the bottom wall that are vertically opposed to each other, and is formed in a shape having a rectangular cross section. The two ends of the second air path 109' in the longitudinal direction each serve as an exit 190' from which air draft blows out. The air draft that has been blown from the second fan 108' into the second air path 109' directly strikes the heat sink 105, and is split into two air streams flowing to the two ends of the second air path 109' in the longitudinal direction. Then, the air streams blow out from the exits 190', while drawing a large amount of heat away from the heat sink 105. In other words, the distance for which the air draft flows from the second fan 108' to each of the exits 190' within the second air path 109' is also shorter than the overall length of the second air path 109', and the air draft is quickly discharged to the outside. This allows the electronic components 130 to be efficiently cooled via the heat sink 105. The air draft blowing out from the exits 190' quickly blows to the outside through the ventilating hole portions 121 provided in the front surface portion 102C and the rear surface portion 102D of the casing cover 102.

Next, the action of the power supply apparatus A101 will be described.

During operation, the electronic components 130 and the electronic components 131 generate heat, resulting in an increase in the temperature of the power supply apparatus A101. The heat of each of the electronic components 130 is conducted into the air in the layout space B101, and is also directly conducted to the heat sink 105. The heat that has been conducted to the heat sink 105 is efficiently dissipated into the air in the second air path 109' by the plurality of fins 151. On the other hand, the coil portions 131A in the electronic components 131 have the greatest tendency to generate heat, and the heat of each of the coil portions 131A is conducted to the air in the first air path 109.

Upon activation of the first and second fans 108 and 108', the air present in the vicinity of the suction ports 180 and 180' is taken in by the first and second fans 108 and 108', and that air is blown as air draft from the discharge ports 181 and 181' into the air paths 109 and 109' in a direction intersecting the longitudinal direction of the first and second air paths 109 and 109'. As a result of this, outside air flows into the layout space B102 from the intake port portions 120.

Upon activation of the first and second fans 108 and 108', the air in the layout space B102 is sucked into the suction ports 180 and 180'. When the air in the layout space B102 is sucked into the suction ports 180 and 180', the pressure in the layout space B102 becomes lower than that of the pressure outside the layout space B102. Then, the air is sucked from the outside of the layout space B102 into the layout space B102 through the intake port portions 120 connecting the layout space B102 with the outside of the layout space B102. Since the power supply apparatus A101 is used in an environment with a lot of dust, the air outside the layout space B102 contains a lot of dust. Therefore, the air that is sucked into the layout space B102 also contains a lot of dust.

The dust-containing air that has been sucked from the intake port portions 120 into the layout space B102 remains in the layout space B102 before flowing into the suction ports 180 and 180'. When the air remains in or flows through the layout space B102, most of the dust present in that air falls. Therefore, the air that is sucked into the suction ports 180 and 180' contains little dust. Then, the first fan 108 can take in the air containing little dust and blow out that air into the first air path 109. Likewise, the second fan 108' can take in the air containing little dust and blow out that air into the second air path 109'.

The air draft that has been blown from the first fan 108 into the first air path 109 strikes the electronic components 131, while being split into two air streams and flowing to the two ends of the air path 109 in the longitudinal direction. At that time, air draft directly strikes the coil portions 131A of the electronic components 131, and therefore heat can be efficiently drawn away from the coil portions 131A. Further, the air draft that has exited from the first fan 108 is split into two air streams flowing to the two ends of the first air path 109 in the longitudinal direction. These air streams flow a relatively short distance until they are discharged to the outside from the two exits 190. Accordingly, the resistance of the air draft flowing through the first air path 109 is reduced, and the air draft is quickly discharged from the exits 190. This allows the electronic components 131 to be efficiently air-cooled.

The air draft that has been blown from the second fan 108' into the second air path 109' directly strikes the heat sink 105 and flows along the fins 151 to the two ends of the air path 109' in the longitudinal direction. At that time, the air draft efficiently strikes many fins 151, and therefore a large amount of heat is drawn away from the surface of each of the fins 151. Further, the air draft that has exited from the second fan 108' is split into two air streams flowing to the two ends of the second air path 109' in the longitudinal direction. These air streams flow a relatively short distance until they are discharged to the outside from the two exits 190'. Accordingly, the resistance of the air draft flowing through the second air path 109' is reduced, and the air draft is quickly discharged from the exits 190'. This allows the heat sink 105 to be efficiently air-cooled, and also enables the electronic components 130 to be efficiently cooled via the heat sink 105.

Since the first and second air paths 109 and 109' are separated into an upper section and a lower section, the electronic components 130 located in the upper section and the electronic components 131 located in the lower section are cooled by the air draft from the first and second fans 108 and 108', without being thermally influenced by each other. This allows the electronic components 130 and the electronic components 131 as well to be efficiently air-cooled.

Further, for example, when the electronic components 131 in the lower section are more susceptible to a temperature increase resulting from heat generation than the heat sink 105 in the upper section, a fan having relatively high blowing power or a large fan may be used as the first fan 108 in the lower section. In other words, the first and second fans 108 and 108' may have different cooling powers. Moreover, for example, if the operations of the electronic components 130 and the electronic components 131 differ over time, the first and second fans 108 and 108' may be activated with different timing in accordance with the difference.

With the power supply apparatus A101 of this embodiment as well, the distance between the first fan 108 and each of the electronic components 131 in the longitudinal direction of the first air path 109 and the distance between the second fan 108' and each of the electronic components 130 in the longitudinal direction of the second air path 109' are shorter than the overall length of the air paths 109 and 109', and therefore the electronic components 130 and the electronic components 131 are arranged in positions relatively close to their respective fans 108 and 108'. Accordingly, the electronic components 130 and the electronic components 131 can be arranged in the F direction along the first and second air paths 109 and 109' with a certain degree of flexibility.

With the power supply apparatus A101 of this embodiment as well, a dust removal operation using an air blow gun is performed. At that time, compressed air is jetted from, for example, one of the exits 190 of the first air path 109, with an air jet nozzle of the air blow gun being aimed at the interior of the air path 109. The compressed air forms a jet following the longitudinal direction of the first air path 109, and vigorously blows away, for example, the dust attached to the coil portions 131A of the electronic components 131 to the other exit 190. The jetting direction of the compressed air jetted from the air blow gun is a direction in conformity with the longitudinal direction of the first air path 109, or in other words, a direction intersecting the blowing direction of the first fan 108. Accordingly, the first fan 108 will not be rotated in reverse at high speed by a strong jet of compressed air during a dust removal operation using the air blow gun, and the blades and the rotational bearings of the fan 108 are thus in no danger of being damaged. Likewise, a dust removal operation using an air blow gun can be performed for the second air path 109' as well. At that time, the blades and the rotational bearings of the second fan 108' are in no danger of being damaged.

With such a power supply apparatus A101 as well, it is possible to suppress the amount of dust entering the first and second air paths 109 and 109' from the first and second fans 108 and 108' along with air draft, and it is therefore not necessary to perform a dust removal operation frequently, making it possible to achieve an increased operating efficiency.

Figure 11:
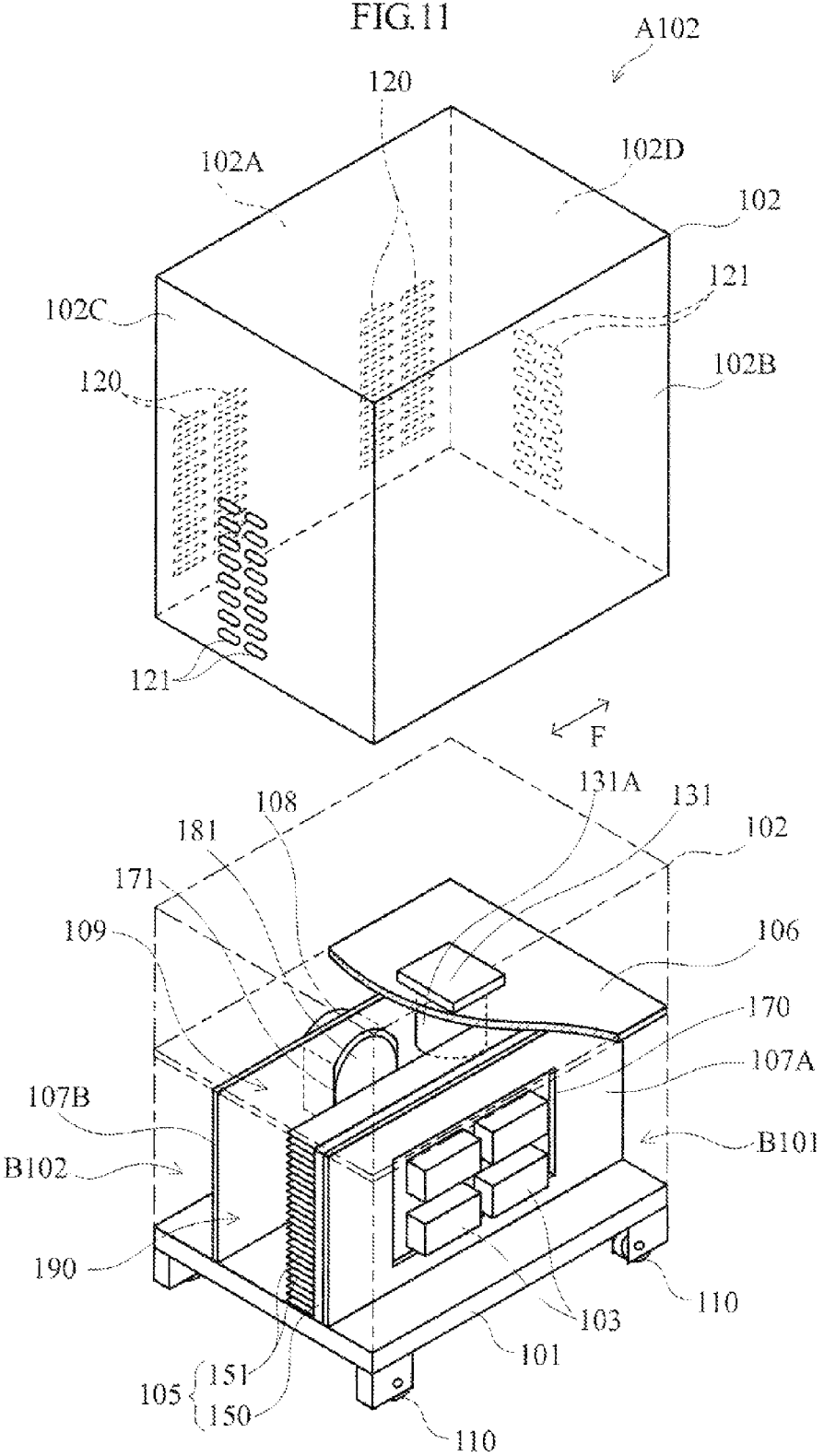
FIG. 11 is an exploded perspective view showing still another embodiment of a power supply apparatus according to the invention.

FIG. 11 shows another embodiment of a power supply apparatus. A power supply apparatus A102 shown in FIG. 11 is configured by adding electronic components 131 to the power supply apparatus A100 shown in FIGS. 1 to 3 and arranging the electronic components 131 in predetermined positions.

With the power supply apparatus A102 shown in FIG. 11, the electronic components 131 are arranged in such a manner that they extend through the parting plate 106 serving as the top wall of the air path 109 and that the coil portions 131A are located in the air path 109. The air draft from the fan 108 flows to the two ends of the air path 109 in the longitudinal direction, while striking the coil portions 131A of the electronic components 131 and the fins 151 of the heat sink 105, and blows from the exits 190 to the outside. With this configuration, a plurality of electronic components arranged along different walls of a single air path 109 can be efficiently air-cooled. In addition, the same effect can also be achieved by arranging the electronic components on the vertical wall on which the fan is arranged, or on the bottom wall that is opposed to the top wall.

Figure 12:
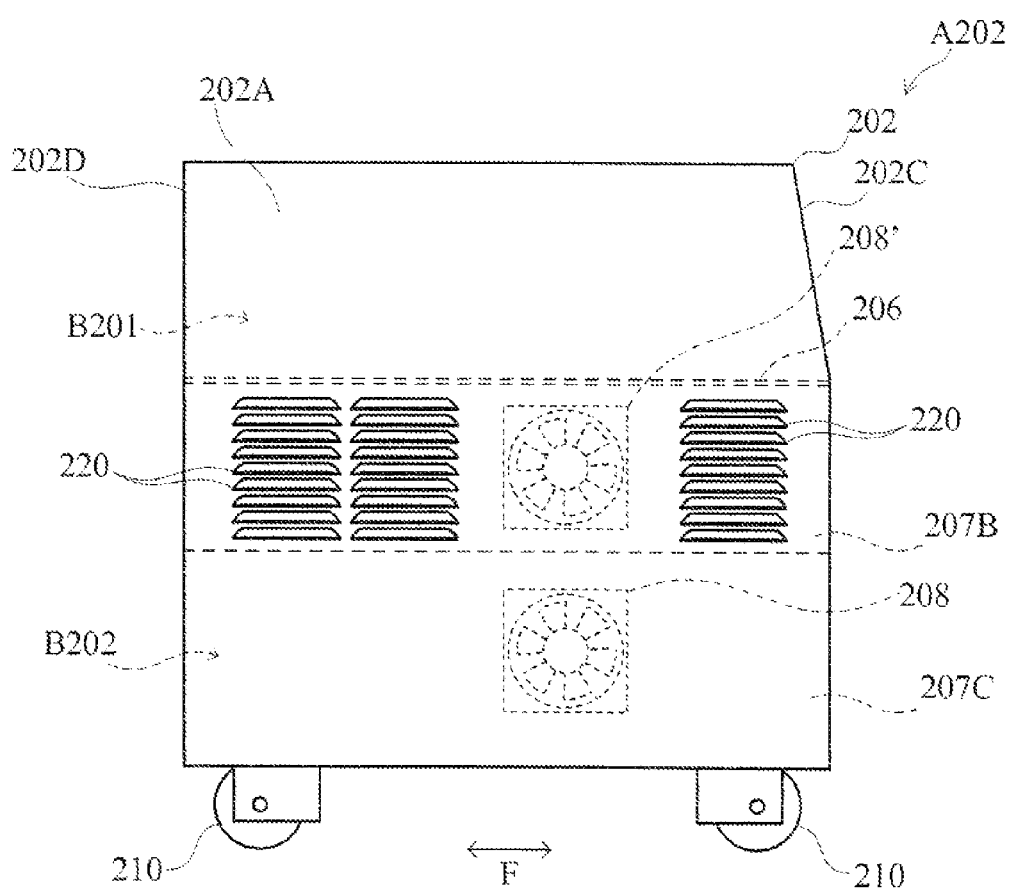
FIG. 12 is a side view showing a further embodiment of a power supply apparatus according to the invention.
Figure 13:
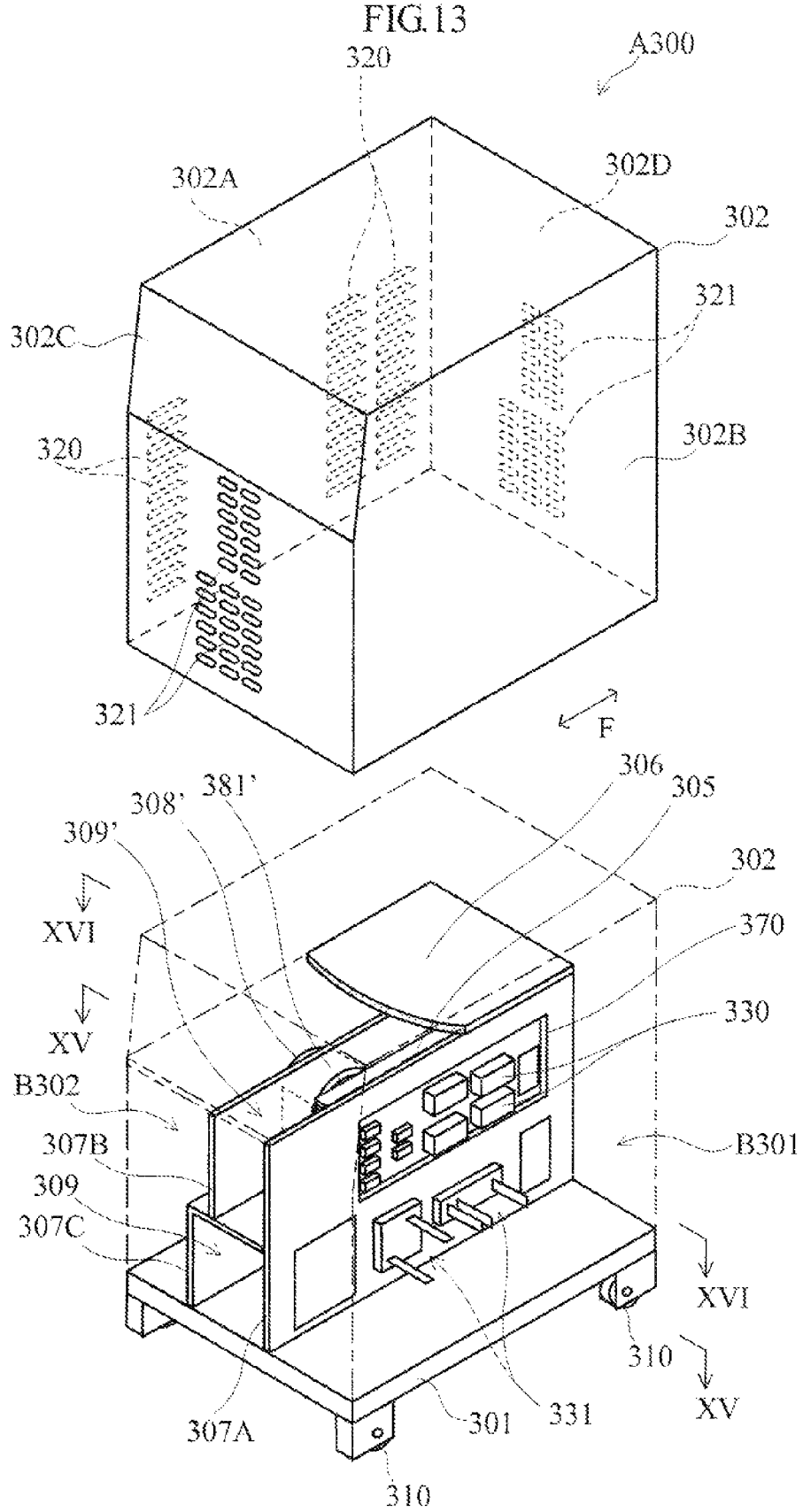
FIG. 13 an exploded perspective view showing a further embodiment of a power supply apparatus according to the invention.
Figure 14:
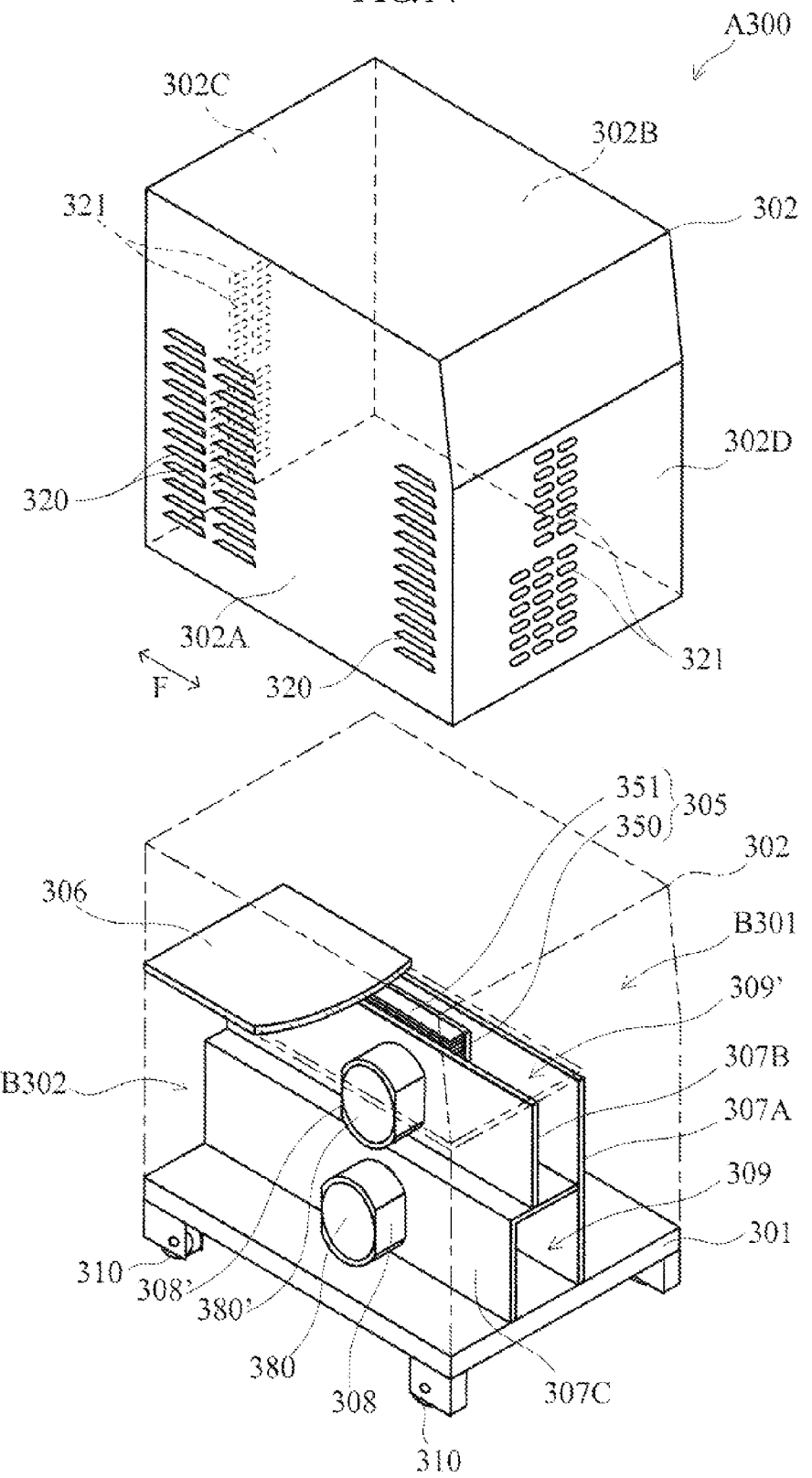
FIG. 14 is an exploded perspective view of the power supply apparatus in FIG. 13 from a different angle.

FIG. 12 shows another embodiment of a power supply apparatus. Note that a power supply apparatus A202 shown in FIG. 12 is different from the power supply apparatus A102 in terms of the position of the intake port portions 220.

With the power supply apparatus A202 shown in FIG. 12, the intake port portions 220 in a side surface portion 202A of a casing cover 202 are provided in areas that are near two ends of the side surface portion 202A in the F direction and are in the vicinity of a vertically intermediate portion of the side surface portion 202A. When the power supply apparatus A202 is placed, for example, on a floor surface in a factory, dust tends to accumulate on the floor surface and air containing an increased amount of dust is present in the vicinity of the floor surface. However, the intake port portions 220 are arranged in positions spaced above such a floor surface to some degree. Therefore, the amount of dust sucked into the layout space B202 through the intake port portions 220 along with the air can be suppressed, which in turn suppresses the amount of dust entering the first and second air paths from the first and second fans 208 and 208' in a more effective manner. The nearer the intake port portions 220 are located to the vertically upper portion, the higher this effect of suppressing the entry of dust can be.

It should be appreciated that the present invention is not limited to the above embodiments.

A plurality of fans may be arranged in a single air path.

For example, the electronic components to be cooled may be arranged along the bottom wall and the top wall of the air path, or along the vertical wall on which the fan is arranged.

The electronic components may be arranged so as to directly face the air path.

For example, the fan may be arranged at one end of the air path in the longitudinal direction, and may be of the axial flow type where the fan is configured to blow air draft from that end in the longitudinal direction to the other end. In this case, for example, a cover member including a fan-opposed wall may be separately provided on the suction port-side of the fan, and the layout space for the fan may be formed by surrounding the fan by this cover member. The intake port portions may be provided in the fan-opposed wall of such a cover member in an area displaced, in an in-plane direction of the fan-opposed wall, relative to an area in front of the suction port. With this configuration as well, it is possible to suppress the entry of dust into the air path in an effective manner.

FIGS. 13 to 21 show one embodiment of a power supply apparatus. A power supply apparatus A300 of this embodiment is used, for example, for outputting large current and high voltage required for arc welding. The power supply apparatus A300 is used, for example, in an environment with a lot of dust, such as a factory.

Figure 15:
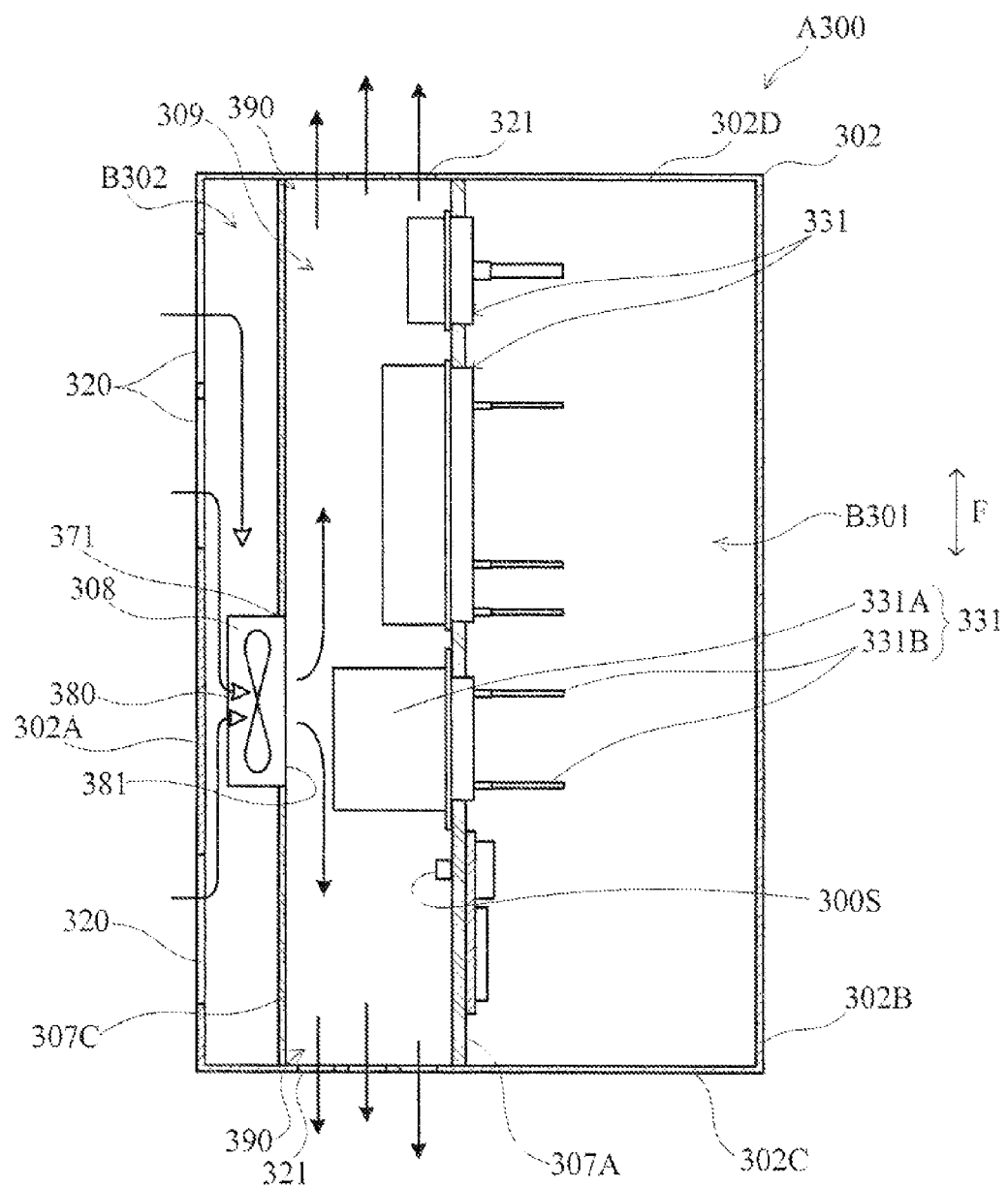
FIG. 15 is a cross-sectional view taken along line XV-XV in FIG. 13.
Figure 16:
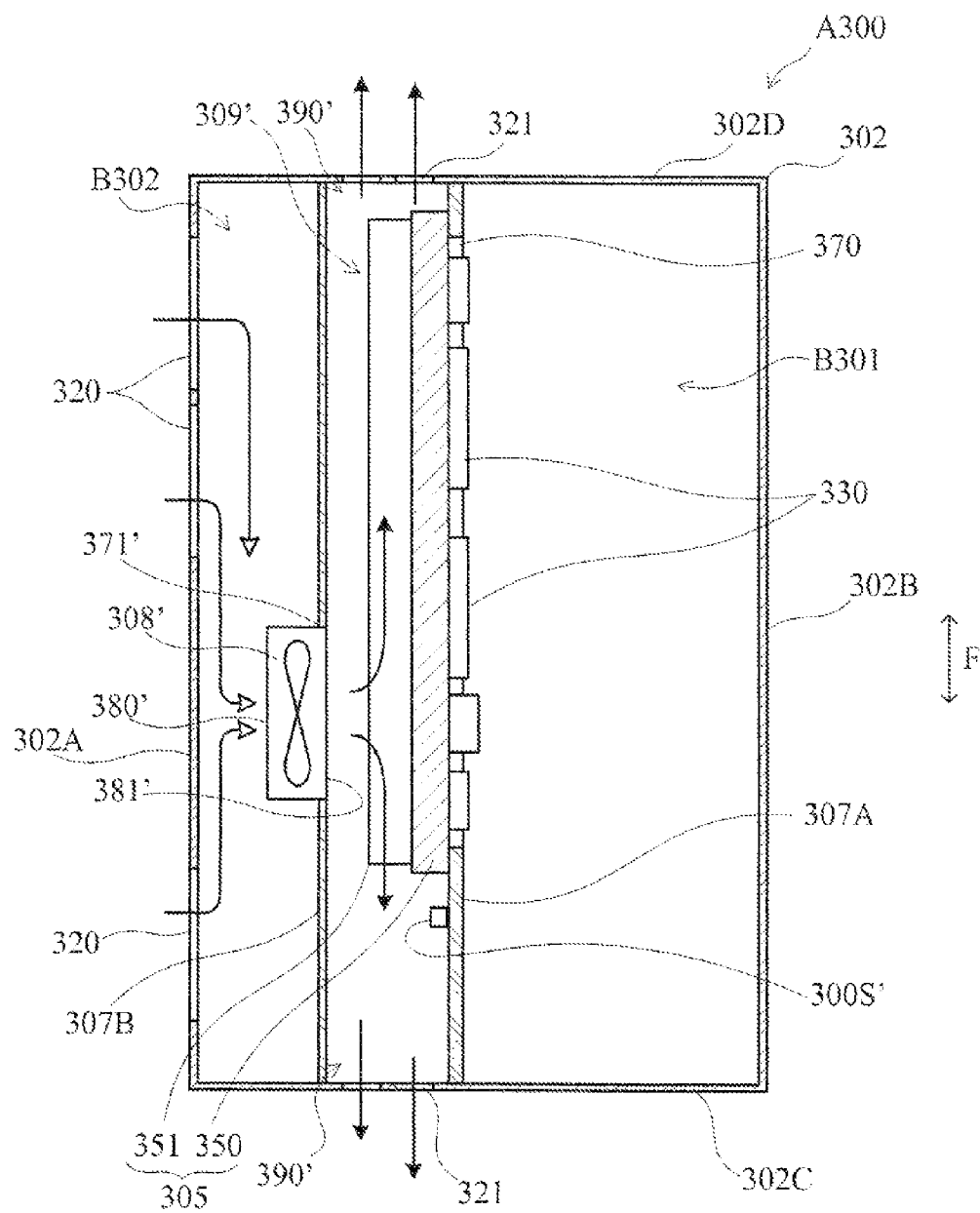
FIG. 16 is a cross-sectional view taken along line XVI-XVI in FIG. 13.
Figure 17:
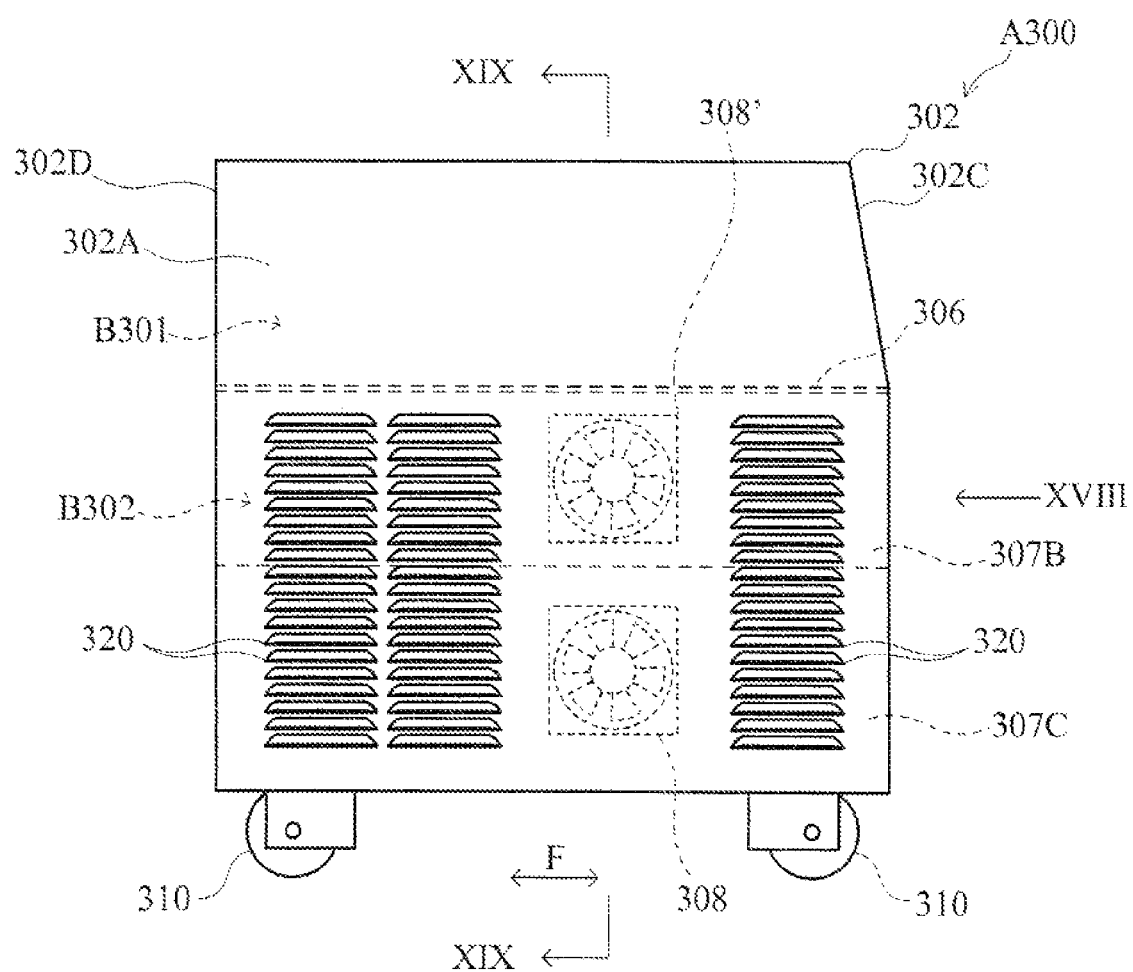
FIG. 17 is a side view of the power supply apparatus shown in FIG. 13.
Figure 18:
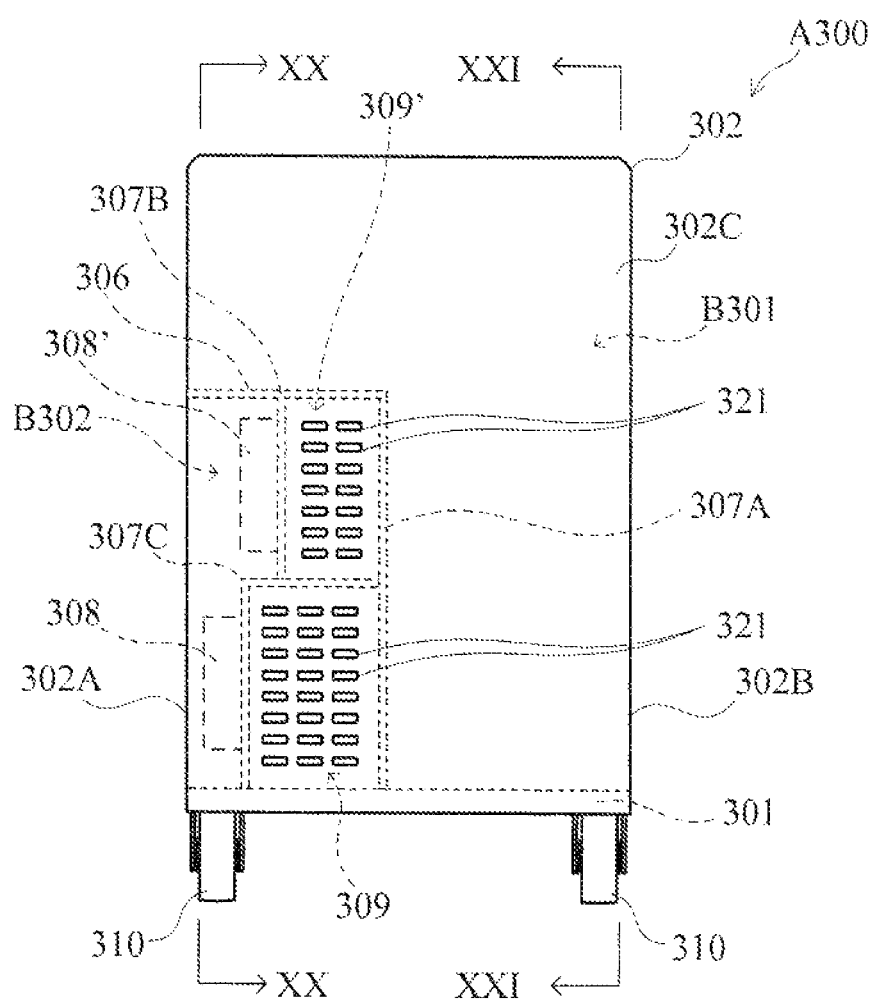
FIG. 18 is a front view of FIG. 17 looking in the direction of arrow XVIII.

The power supply apparatus A300 includes a base member 301, a casing cover 302, electronic components 330 and electronic components 331 constituting a power circuit, a heat sink 305, a first parting plate 306, second parting plates 307A and 307B, a third parting plate 307C, first and second fans 308 and 308', as well as first and second temperature sensors 300S and 300S' (see FIGS. 15 and 16). Inside the apparatus, a hollow first air path 309 is provided that is surrounded by the lower part of the second parting plate 307A, the third parting plate 307C, and part of the base member 301. Above the first air path 309, a hollow second air path 309' is provided that is surrounded by part of the first parting plate 306, an upper part of the second parting plate 307A, the second parting plate 307B, and part of the third parting plate 307C. The air paths 309 and 309' extend longitudinally in the front-rear direction of the power supply apparatus A300 (hereinafter, referred to as "F direction"). Additionally, a layout space B301 for the electronic components 330 and the like that is surrounded by part of the base member 301, part of the casing cover 302, part of the first parting plate 306, and the second parting plate 307A is provided in the apparatus outward of the first and second air paths 309 and 309'. Also, a layout space B302 for the fans 308 and 308' is provided that is surrounded by part of the base member 301, part of the casing cover 302, part of the first parting plate 306, the second parting plate 307B, and the third parting plate 307C. The layout space B301 for the electronic components 330 and the like is in communication with a space located above the first parting plate 306.

Figure 19:
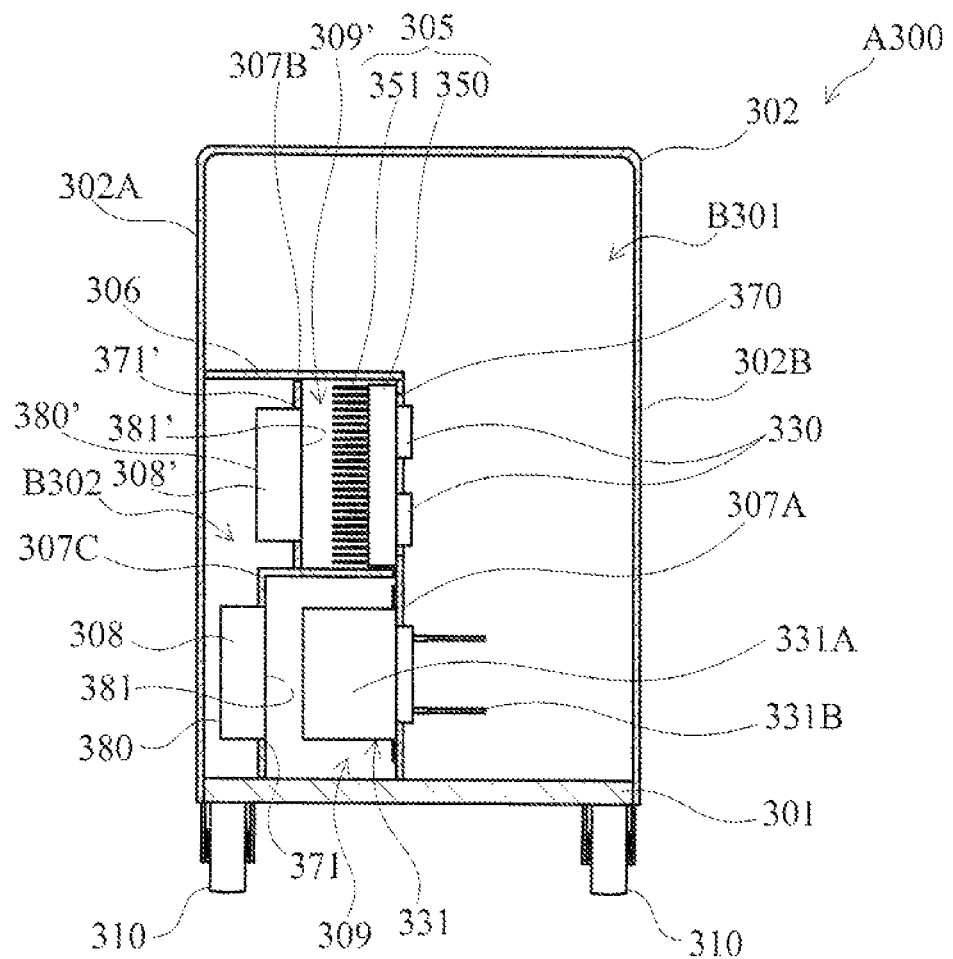
FIG. 19 is a cross-sectional view taken along line XIX-XIX in FIG. 17.
Figure 20:
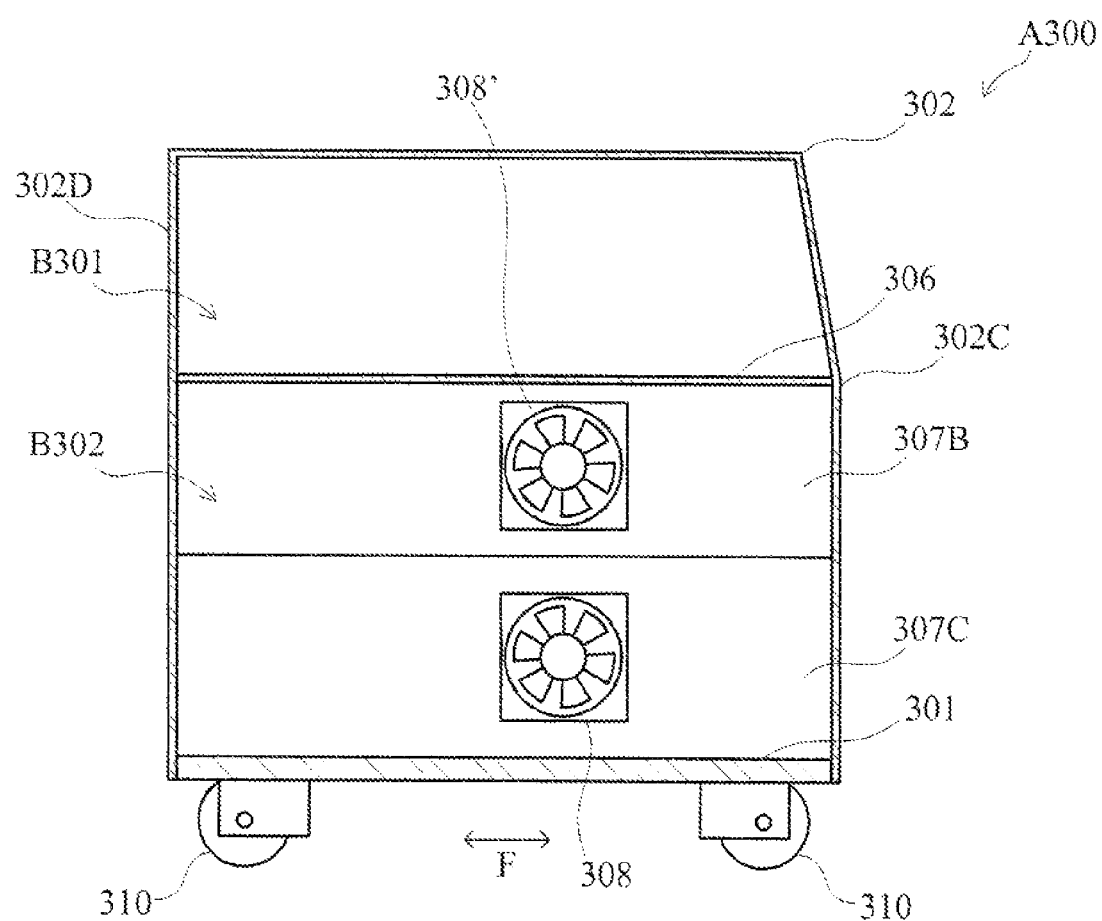
FIG. 20 is a cross-sectional view taken along line XX-XX in FIG. 18.

The base member 301 is an elongated rectangular plate member that is elongated in the F direction. A plurality of wheels 310 are pivotally attached to the under surface of the base member 301 via brackets. The wheels 310 allow the base member 301 to move on a floor surface. As shown in FIG. 19, the second parting plate 307A is arranged in the central portion of the top surface of the base member 301, perpendicularly to the top surface. The third parting plate 307C is arranged so as to cover a lower part of one side of the second parting plate 307A and part of the top surface of the base member 301.

The casing cover 302 is made of, for example, metal and serves to protect the interior of the apparatus. The casing cover 302 has the shape of a box that is removable from the base member 301, and includes two side surface portions 302A and 302B forming vertical planes along two lateral sides of the base member 301, and a front surface portion 302C and a rear surface portion 302D forming vertical planes along the front end and the rear end, respectively, of the base member 301. As shown in FIG. 16, the side surface portion 302A of the casing cover 302 forms an opposed wall opposing to the first and second fans 308 and 308'. Intake port portions 320 for guiding outside air into the layout space B302 are provided in areas near two ends of the side surface portions 302A in the F direction (see FIGS. 15 and 16). The intake port portions 320 are each formed by many slit holes having a relatively small size. As shown in FIGS. 15 and 16, the areas of the front surface portion 302C and the rear surface portion 302D that correspond to the first and second air paths 309 and 309' are each provided with ventilating hole portions 321 for guiding air draft from the air paths 309 and 309' to the outside. The ventilating hole portions 321 are each formed by many holes having a relatively large size for better ventilation.

Figure 21:
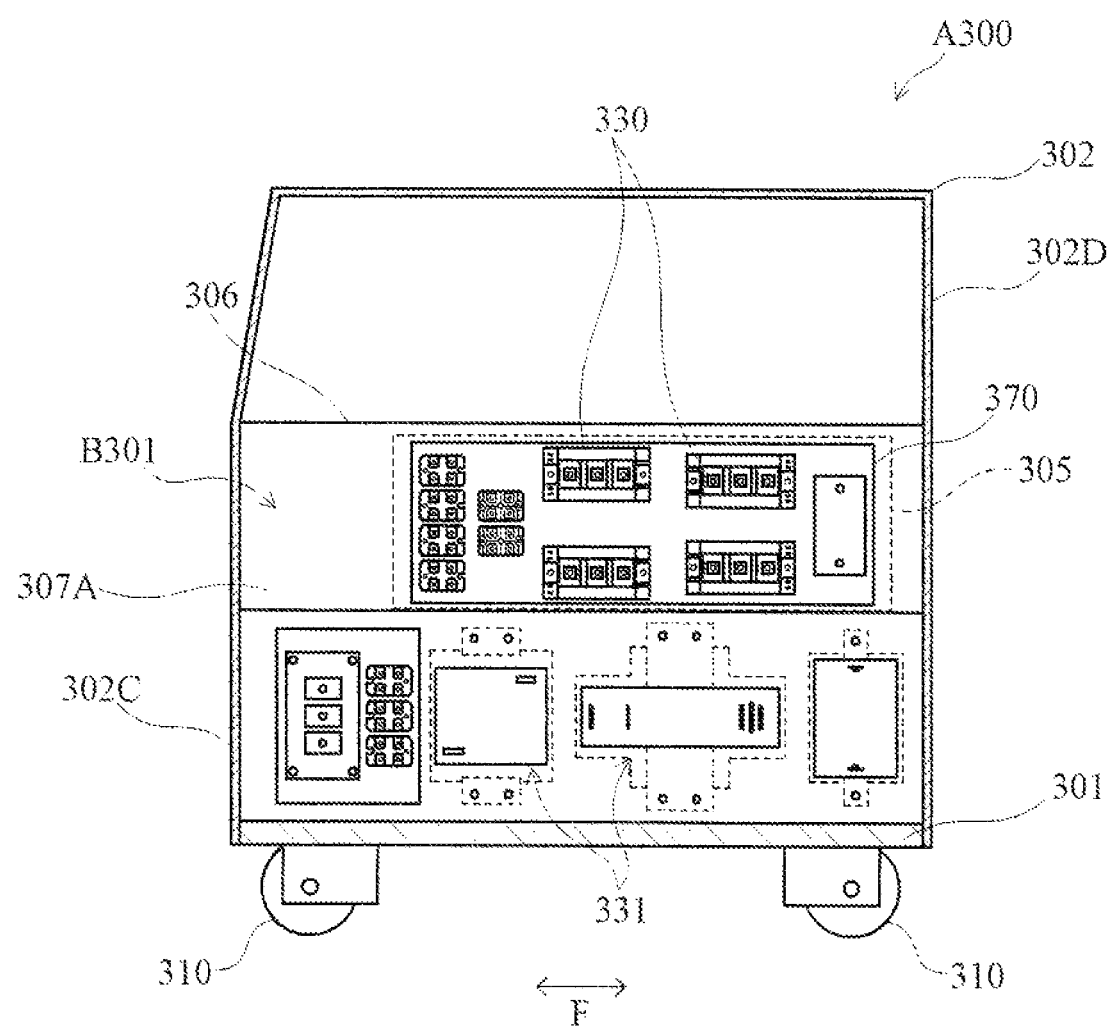
FIG. 21 is a cross-sectional view taken along line XXI-XXI in FIG. 18.

As shown in FIGS. 16, 19 and 21, the electronic components 330 are a switching element, a diode, a capacitor, a microcomputer, and the like. The electronic components 330 are directly attached to the heat sink 305 through the upper part of the second parting plate 307A. Accordingly, heat from each of the electronic components 330 is quickly conducted to the heat sink 305. As shown in FIGS. 15, 19 and 21, the electronic components 331 are a transformer, a reactor, and the like, and each include a coil portion 331A and terminal portions 331B. At least a tip part of each coil portion 331A is located in the first air path 309, and the terminal portions 331B are arranged in the layout space B301 in which the electronic components 330 are likewise arranged. In other words, the electronic components 331 extend through a lower part of the second parting plate 307A, and are arranged so as to face the layout space B301 and the first air path 309. Such electronic components 331 are relatively large and heavy. For this reason, the electronic components 331 are weight-balanced when being fixed so as to penetrate the second parting plate 307A, and the amount of projection of the coil portions 331A facing the first air path 309 is adjusted. Note that the winding of the coil portions 331A of the electronic components 331 may be exposed, or the winding may be sealed by molding resin. The microcomputer may be incorporated in a control circuit different from the power circuit.

As shown in FIGS. 16 and 19, the heat sink 305 is a heat dissipating member made of, for example, aluminum, and includes a base 350 fixed to the second parting plate 307A, and a plurality of vertically aligned fins 351 extending from the base 350 in the F direction. The electronic components 330 are directly attached via screws (not shown) or the like to part of the base 350 that is opposed to the second parting plate 307A. The plurality of fins 351 are portions that efficiently dissipate the heat conducted from the base 350 into the air, and have an increased surface area to achieve an improved heat dissipating effect. In this embodiment, the heat sink 305 is also cooled. Note that a plurality of heat sinks 305 may be arranged so as to be aligned in the F direction along the second parting plate 307A.

As shown in FIG. 19, the first parting plate 306 is made of, for example, metal and serves to vertically separate spaces such as the layout space B302 for the fans 308 and 308' and the second air path 309' from the layout space B101 for the electronic components 330. The first parting plate 306 has approximately the same length in the F direction as that of the base member 301, and one of its ends in the transverse direction is bonded perpendicularly to the upper end of the second parting plate 307A. Consequently, the first parting plate 306 is horizontally located in a vertically intermediate portion of the casing cover 302. The first parting plate 306 forms the top wall of the layout space B302 for the fans 308 and 308' and the second air path 309'.

The second parting plate 307A is made of, for example, metal and serves to separate the first and second air paths 309 and 309' from the layout space B301. The second parting plate 307A also has a dimension in the F direction that is approximately the same as that of the base member 301. The second parting plate 307A is arranged perpendicularly to the base member 301 and the first parting plate 306. Accordingly, the second parting plate 307A forms a vertical wall of the first and second air paths 309 and 309'. The upper part of the second parting plate 307A is provided with a rectangular window 370 for causing part of the base 350 of the heat sink 305 to be exposed to the layout space B301 and allowing the electronic components 330 to be attached to that part. The rectangular window 370 is formed in a size slightly smaller than that of the base 350, and is closed by the base 350. An opening through which the electronic components 331 can be fitted is formed in a lower part of the second parting plate 307A (reference numeral is omitted).

The second parting plate 307B is made of, for example, metal and serves to separate the second air path 309' from the layout space B302. The second parting plate 307B also has approximately the same dimension in the F direction as that of the base member 301. The second parting plate 307B is arranged so as to be opposed to an upper part of the second parting plate 307A, and its upper and lower ends are bonded perpendicularly to the first parting plate 306 and the third parting plate 307C. Accordingly, the second parting plate 307B forms a vertical wall of the second air path 309'. An opening 371' for allowing the second fan 308' to face the second air path 309' is provided in an intermediate portion in the F direction of the second parting plate 307B (see FIG. 16).

The third parting plate 307C is made of, for example, metal and is formed in a shape having an L-shaped cross section so as to surround the first air path 309. The third parting plate 307C as well has approximately the same dimension in the F direction as that of the base member 301. Whereas the tip end of a horizontal part of the third parting plate 307C is bonded perpendicularly to the central part of the second parting plate 307A, the base end of the vertical part is bonded perpendicularly to the base member 301. Consequently, the horizontal part of the third parting plate 307C forms the top wall of the first air path 309 and the bottom wall of the second air path 309', and the vertical part forms a vertical wall of the first air path 309 that is opposed to a lower part of the second parting plate 307A. An opening 371 for allowing the first fan 308 to face the first air path 309 is provided in an intermediate portion in the F direction of the vertical part of the third parting plate 307C (see FIG. 15).

As shown in FIGS. 15 and 19, the lower first fan 308 is of the axial flow type where a plurality of blades and an electric motor (not shown) are integrated, and includes a suction port 380 and a discharge port 381 for air on two axial ends of its electric motor. The first fan 308 is arranged such that the discharge port 381 coincides with the opening 371 of the third parting plate 307C. In other words, the first fan 308 is arranged in a longitudinally intermediate portion of the first air path 309, and the discharge port 381 is located so as to face the air path 309. Consequently, the blowing direction of the first fan 308 is a direction intersecting the longitudinal direction of the first air path 309 in the horizontal plane. The suction port 380 is located in the layout space B302, and is opposed to the side surface portion 302A with a predetermined interval. The intake port portion 320 is not provided in an area of the side surface portion 302A that is in front of the suction port 380. In other words, the suction port 380 is located a certain distance away from the intake port portions 320 located near two ends of the side surface portion 302A in the F direction.

As shown in FIGS. 16 and 19, the upper second fan 308' is of the axial flow type as with the first fan 308, and includes a suction port 380' and a discharge port 381' for air on the two axial ends. The second fan 308' is arranged such that the discharge port 381' coincides with the opening 371' of the second parting plate 307B. In other words, the second fan 308' is arranged in a longitudinally intermediate portion of the second air path 309', and the discharge port 381' is located so as to face the air path 309'. Consequently, the blowing direction of the second fan 308' is a direction intersecting the longitudinal direction of the second air path 309' in the horizontal plane. The suction port 380' is located in the layout space B302, and is opposed to the side surface portion 302A with a predetermined interval. The intake port portion 320 is not provided in an area of the side surface portion 302A that is in front of the suction port 380'. In other words, the suction port 380' is located a certain distance away from the intake port portions 320 located near two ends of the side surface portion 302A in the F direction. Note that in this embodiment, the first and second fans 308 and 308' have air volumes different from each other, and the upper second fan 308' has a larger air volume than that of the lower first fan 308.

As shown in FIG. 15, the first air path 309 directly air-cools the electronic components 331 using air draft from the first fan 308, and guides that air draft to its two ends in the longitudinal direction. The first air path 309 is surrounded by a lower part of the second parting plate 307A and the vertical part of the third parting plate 307C serving as a pair of vertical walls that are opposed to each other in the width direction, as well as by the horizontal part of the third parting plate 307C and part of the base member 301 serving as the top wall and the bottom wall that are vertically opposed to each other, and is formed in a shape having a rectangular cross section. The two ends of the first air path 309 in the longitudinal direction each serve as an exit 390 from which air draft blows out. The air draft that has been blown from the first fan 308 into the first air path 309 directly strikes the coil portions 331A of the electronic components 331, and is split into two air streams flowing to the two ends of the first air path 309 in the longitudinal direction. Then, the air streams blow out from the exits 39090, while drawing a large amount of heat away from the coil portions 331A. The air draft quickly blows to the outside through the ventilating hole portions 321 provided in the front surface portion 302C and the rear surface portion 302D of the casing cover 302. The average distance for which the air draft flows from the first fan 308 to each of the exits 390 within the first air path 309 is about half the overall length of the air path 309. This enables the air draft from the first fan 308 to quickly flow through the first air path 309 and to be discharged to the outside, allowing the electronic components 331 to be efficiently air-cooled by air draft flowing through the first air path 309.

The first air path 309 is provided with the first temperature sensor 300S for detecting the internal temperature thereof. The first temperature sensor 300S is arranged, for example, on the surface of the second parting plate 307A. Note that the first temperature sensor 300S may be directly attached, for example, to the electronic components 331. The first temperature sensor 300S outputs a signal to the microcomputer. In accordance with a signal from the first temperature sensor 300S, the microcomputer prevents the first fan 308 from operating when the internal temperature of the first air path 309 is less than 50° C., for example. The microcomputer causes the first fan 308 to be rotated at low speed when the internal temperature of the first air path 309 is 50° C. or greater and less than 70° C. The microcomputer causes the first fan 308 to be rotated at high speed when the internal temperature of the first air path 309 has increased to 70° C. or greater. The microcomputer stops the overall operation of the power circuit constituted by the electronic components 330 and the electronic components 331 when the internal temperature of the first air path 309 has increased from 70° C. and reached a predetermined temperature.

As shown in FIG. 16, the second air path 309' air-cools the heat sink 305 using air draft from the second fan 308', and guides that air draft to its two ends in the longitudinal direction. The second air path 309' is surrounded by the upper part of the second parting plate 307A and the second parting plate 307B serving as a pair of vertical walls that are opposed to each other in the width direction, as well as by part of the first parting plate 306 and the horizontal part of the third parting plat 307C serving as the top wall and the bottom wall that are vertically opposed to each other, and is formed in a shape having a rectangular cross section. In other words, the second air path 309' is separated from the first air path 309 by the horizontal part of the third parting plate 307C as the partition wall, and is arranged above the first air path 309. The two ends of the second air path 309' in the longitudinal direction each serve as an exit 390' from which air draft blows out. The air draft that has been blown from the second fan 308' into the second air path 309' directly strikes the heat sink 305, and is split into two air streams flowing to the two ends of the second air path 309' in the longitudinal direction. Then, the air streams blow out from the exits 390', while drawing a large amount of heat away from the heat sink 305. The average distance for which the air draft flows from the second fan 308' to each of the exits 390' within the second air path 309' as well is about half the overall length of the air path 309'. This enables the air draft from the second fan 308' to quickly flow through the second air path 309' and to be discharged to the outside, allowing the heat sink 305 to be efficiently air-cooled by air draft flowing through the second air path 309'. Consequently, the electronic components 330 are efficiently cooled via the heat sink 305.

The second air path 309' is provided with the second temperature sensor 300S' for detecting the internal temperature thereof. The second temperature sensor 300S' is arranged, for example, on the surface of the second parting plate 307A. Note that the second temperature sensor 300S' may be directly attached, for example, to the heat sink 305. The second temperature sensor 300S' outputs a signal to the microcomputer. In accordance with a signal from the second temperature sensor 300S', the microcomputer prevents the second fan 308' from operating when the internal temperature of the second air path 309' is less than 40° C., for example. The microcomputer causes the second fan 308' to be rotated at low speed when the internal temperature of the second air path 309' is 40° C. or greater and less than 60° C. The microcomputer causes the second fan 308' to be rotated at high speed when the internal temperature of the second air path 309' has increased to 60° C. or greater. Further, the microcomputer stops the overall operation of the power circuit constituted by the electronic components 330 and the electronic components 331 when the internal temperature of the second air path 309' has increased from 60° C. and reached a predetermined temperature.

Next, the action of the power supply apparatus A300 will be described.

During operation, the electronic components 330 and the electronic components 331 generate heat as the power supply apparatus A300 outputs large current and high voltage for welding, resulting in an increase in the temperature of the power supply apparatus A300. The heat of each of the electronic components 330 is conducted into the air in the layout space B301, and is also directly conducted to the heat sink 305. The heat that has been conducted to the heat sink 305 is efficiently dissipated into the air in the second air path 309' by the plurality of fins 351. On the other hand, the coil portions 331A in the electronic components 331 have the greatest tendency to generate heat, and the heat of each of the coil portions 331A is conducted to the air in the first air path 309'.

Upon activation of the first and second fans 308 and 308', the air present in the vicinity of the suction ports 380 and 380' is sucked in by the first and second fans 308 and 308', and that air is blown as air draft from the discharge port 381 into the air paths 309 and 309' in a direction intersecting the longitudinal direction of the first and second air paths 309 and 309'. As a result of this, outside air flows into the layout space B302 from the intake port portions 320.

Upon activation of the first and second fans 308 and 308', the air in the layout space B302 is sucked into the suction ports 380 and 380'. When the air in the layout space B302 is sucked into the suction ports 380 and 380', the pressure in the layout space B302 becomes lower than that of the pressure outside the layout space B302. Then, the air is sucked from the outside of the layout space B302 into the layout space B302 through the intake port portions 320 connecting the layout space B302 with the outside of the layout space B302. Since the power supply apparatus A300 is used in an environment with a lot of dust, the air outside the layout space B302 contains a lot of dust. Therefore, the air that is sucked into the layout space B302 also contains a lot of dust.

The dust-containing air that has been sucked from the intake port portions 320 into the layout space B302 remains in the layout space B302 before flowing into the suction ports 380 and 380'. When the air remains in or flows through the layout space B302, most of the dust present in that air falls. Therefore, the air that is sucked into the suction ports 380 and 380' contains little dust. Then, the first fan 308 can take in the air containing little dust and blow out that air into the first air path 309. Likewise, the second fan 308' can take in the air containing little dust and blow out that air into the second air path 309'

The air draft that has been blown from the first fan 308 into the first air path 309 strikes the electronic components 331, while being split into two air streams and flowing to the two ends of the air path 309 in the longitudinal direction. At that time, air draft directly strikes the coil portions 331A of the electronic components 331, and therefore heat can be efficiently drawn away from the coil portions 331A. Further, the air draft that has exited from the first fan 308 is split into two air streams flowing to the two ends of the first air path 309 in the longitudinal direction. These air streams flow a relatively short distance until they are discharged to the outside from the two exits 390. Accordingly, the resistance of the air draft flowing through the first air path 309 is reduced, and the air draft is quickly discharged from the exits 390. This allows the electronic components 331 to be efficiently air-cooled.

The air draft that has been blown from the second fan 308' into the second air path 309' directly strikes the heat sink 305 and flows along the fins 351 to the two ends of the second air path 309' in the longitudinal direction. At that time, the air draft efficiently strikes many fins 351, and therefore a large amount of heat is drawn away from the surface of each of the fins 351. Further, the air draft that has exited from the second fan 308' is split into two air streams flowing to the two ends of the air path 309' in the longitudinal direction. These air streams flow a relatively short distance until they are discharged to the outside from the two exits 390'. Accordingly, the resistance of the air draft flowing through the second air path 309' is reduced, and the air draft is quickly discharged from the exits 390'. This allows the heat sink 305 to be efficiently air-cooled, and also enables the electronic components 330 to be efficiently cooled via the heat sink 305.

The first and second air paths 309 and 309' are separated into an upper section and a lower section by the horizontal part of the third parting plate 307C. Therefore, for example, the air in the first air path 309 in the lower section that has been heated by the heat from the electronic components 331 tends to rise as its temperature increases, but is quickly discharged to the outside without entering the second air path 309' in the upper section. Accordingly, the electronic components 330 located in the upper section and the electronic components 331 located in the lower section are efficiently cooled by the air draft from the first and second fans 308 and 308', without being thermally influenced by each other.

In this embodiment, the first and second fans 308 and 308' have different air volumes. Furthermore, the rotational speeds of the first and second fans 308 and 308' are variably controlled according to the internal temperatures of the first and second air paths 309 and 309'. Accordingly, the air draft flowing through the first the and second air paths 309 and 309' are set to suitable air speeds according to the objects that are to be cooled and the temperature rising characteristics, and the heat sink 305 located in the upper section and the electronic components 331 located in the lower section are efficiently cooled by air drafts of different air speeds. In this embodiment, in particular, the air volume of the upper second fan 308' is larger than that of the lower first fan 308. Therefore, the heat sink 305 located in the upper section can be more easily air-cooled, and the electronic components 330 are efficiently cooled via such a heat sink 305. Furthermore, the first and second fans 308 and 308' are controlled independently of each other, and the operation of these fans is stopped until the internal temperatures of the first and second air paths 309 and 309' reach predetermined temperatures, which also contributes to power saving and noise reduction.

The power supply apparatus A300 is placed, for example, on a floor surface in a factory. In the vicinity of the floor surface, dust tends to accumulate and air containing an increased amount of dust is present. When the first and second fans 308 and 308' are activated in such a state, the lower first fan 308 tends to suck the air present close to the floor surface more than the upper fan does. However, the lower first fan 308 has a smaller air volume and a lower suction power than the upper second fan 308'. This suppresses the amount of dust sucked in by the lower first fan 308, making it possible to prevent the entry of dust from the first fan 308 in an effective manner even for the lower air path 309, which is located closer to the floor surface.

During operation of the power supply apparatus A300, if the first and second fans 308 and 308' undergo an air volume decrease or stop blowing air due to failure or the like, or if the electronic components 331 and the heat sink 305 are overheated beyond the cooling power achieved by air draft from the fans 308 and 308', the internal temperatures of the first and second air paths 309 and 309' rise. The internal temperatures of the first and second air paths 309 and 309' are independently detected by the first and second temperature sensors 300S and 300S', and the overall operation of the power circuit constituted by the electronic components 330 and the electronic components 331 is stopped when the internal temperature of either one of the first and second air paths 309 and 309' reaches a temperature greater than equal to a predetermined temperature. Accordingly, the power supply apparatus A300 has a fail-safe function by which, for example, the overall operation can be immediately stopped by merely a sudden reduction in the cooling power of either one of the first and second air paths 309 and 309', and therefore can safely output large current and high voltage necessary for arc welding or the like.

For example, when the electronic components 331 in the lower section are more susceptible to a temperature increase resulting from heat generation than the heat sink 305 in the upper section, a fan having a high air volume may be used as the first fan 308 in the lower section. Moreover, for example, if the operations of the electronic components 330 and the electronic components 331 differ over time, the first and second fans 308 and 308' may be activated with different timing in accordance with the difference.

The first and second fans 308 and 308' are located in longitudinally intermediate portions of the first and second air paths 309 and 309', as a result of which the electronic components 330 and the electronic components 331 that are to be cooled are located in the vicinity of their respective fans 308 and 308'. In other words, the distance between the first fan 308 and each of the electronic components 331 in the F direction and the distance between the second fan 308' and each of the electronic components 330 in the F direction are shorter than the overall lengths of the first and second air paths 309 and 309', and therefore the electronic components 330 and the electronic components 331 are arranged in positions relatively close to the fans 308 and 308'. This positional relationship in the F direction also allows the electronic components 330 and the electronic components 331 to be efficiently cooled. Accordingly, it is not necessary to determine the positions of the electronic components 330 and the electronic components 331 in the F direction according to their heat-generating properties, and it is therefore possible to arrange these electronic components with a certain degree of flexibility.

During operation of the power supply apparatus A300, a dust removal operation using an air blow gun is performed. At that time, compressed air is jetted from, for example, one of the exits 390 of the first air path 309, with an air jet nozzle of the air blow gun being aimed at the interior of the air path 309. The compressed air forms a jet following the longitudinal direction of the first air path 309, and vigorously blows away, for example, the dust attached to the coil portions 331A of the electronic components 331 to the other exit 390. The jetting direction of the compressed air jetted from the air blow gun is a direction in conformity with the longitudinal direction of the first air path 309, or in other words, a direction intersecting the blowing direction of the first fan 308. Accordingly, the first fan 308 will not be rotated in reverse at high speed by a strong jet of compressed air during a dust removal operation using the air blow gun, and the blades and the rotational bearings of the fan 308 are thus in no danger of being damaged. Likewise, a dust removal operation using an air blow gun can be performed for the second air path 309' as well. At that time, the blades and the rotational bearings of the second fan 308' are in no danger of being damaged. Moreover, it is possible to suppress the amount of dust entering the first and second air paths 309 and 309' from the first and second fans 308 and 308' along with air draft, and it is therefore not necessary to perform a dust removal operation frequently, making it possible to achieve an increased operating efficiency.

Figure 22:
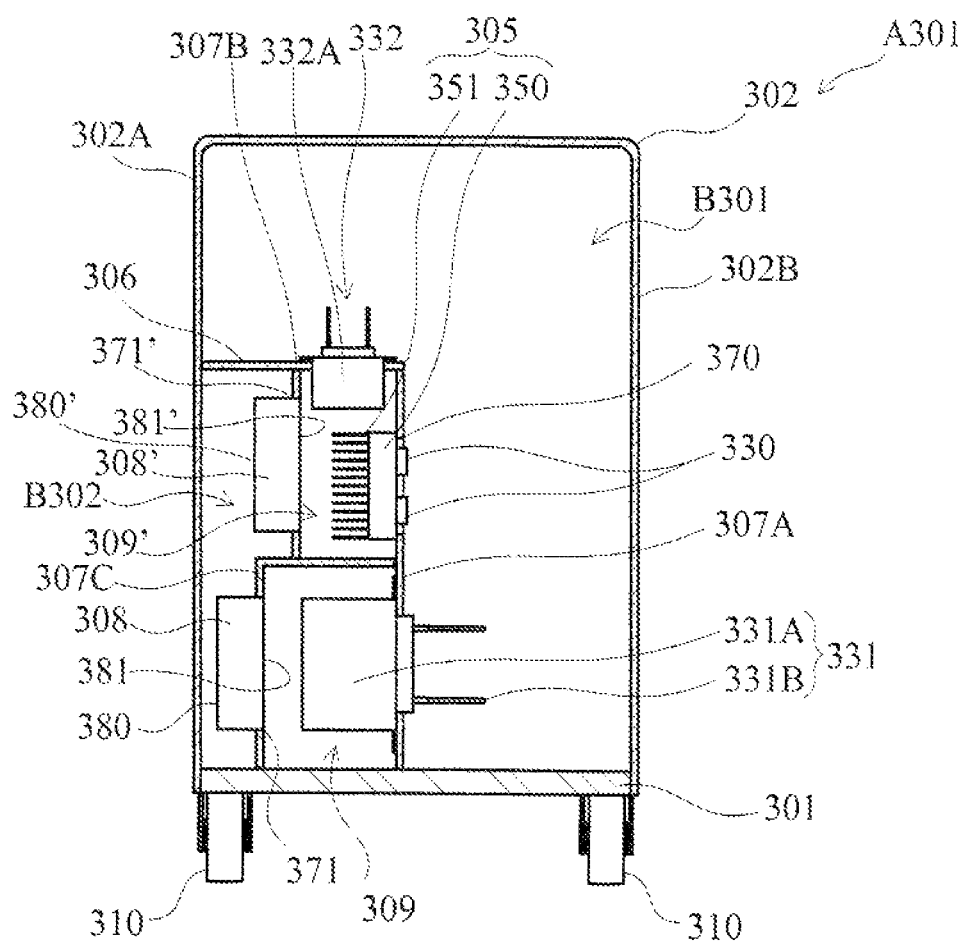
FIG. 22 is a cross-sectional view showing a further embodiment of a power supply apparatus according to the invention.
Figure 23:
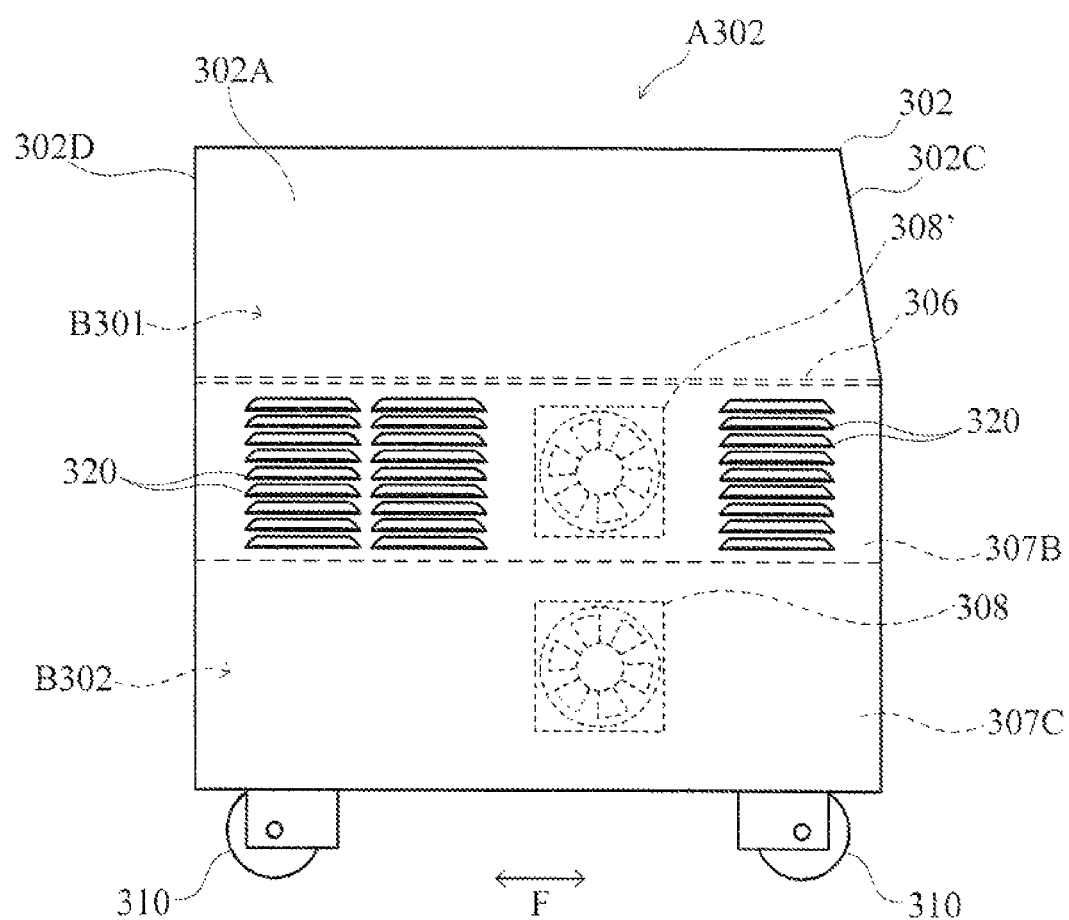
FIG. 23 is a side view showing a further embodiment of a power supply apparatus according to the invention.

FIGS. 22 and 23 show other embodiments of a power supply apparatus. Note that a power supply apparatus A301 shown in FIG. 22 is configured by adding electronic components 332 that are different from those of the above-described embodiments and arranging the electronic components 332 in predetermined positions. A power supply apparatus A302 shown in FIG. 23 is different from the above-described embodiments in the position of intake port portions 320. Components that are identical or similar to those of the above-described embodiments are denoted by identical or similar reference numerals, and the description thereof has been omitted.

With the power supply apparatus A301 shown in FIG. 22, the electronic components 332 are arranged in such a manner that they extend through the first parting plate 306 serving as the top wall of the second air path 309' and that coil portions 332A are located in the air path 309'. The air draft from the second fan 308' flows to the two ends of the second air path 309' in the longitudinal direction, while striking the coil portions 332A of the electronic components 332 and the fins 351 of the heat sink 305, and blows to the outside. With this configuration, a plurality of electronic components arranged along different walls of a single air path 309' can be efficiently air-cooled. In addition, the same effect can also be achieved by arranging the electronic components on the vertical wall on which the fan is arranged, or on the bottom wall that is opposed to the top wall.

With the power supply apparatus A302 shown in FIG. 23, the intake port portions 320 in the side surface portion 302A of the casing cover 302 are provided in areas that are near two ends of the side surface portion 302A in the F direction and are in the vicinity of a vertically intermediate portion of the side surface portion 302A. When the power supply apparatus A302 is placed, for example, on a floor surface in a factory, the intake port portions 320 are spaced above an area in the vicinity of the floor surface where dust accumulates. Therefore, the amount of dust sucked into the layout space B302 through the intake port portions 320 along with the air can be suppressed, which in turn suppresses the amount of dust entering the first and second air paths from the first and second fans 308 and 308' in a more effective manner. The nearer the intake port portions 320 are located to the vertically upper portion, the higher this effect of suppressing the entry of dust can be.

It should be appreciated that the present invention is not limited to the above-described embodiments.

The electronic components may be arranged so as to directly face the air path.

For example, the fan may be arranged at one end of the air path in the direction, and may be configured to blow air draft from that end in the longitudinal direction to the other end. In this case, the other end of the air path in the longitudinal direction serves as an exit for air draft.

For example, the first and second air paths may be arranged so as to be adjacent to each other in the horizontal direction.

The number of the air paths is not limited to two, and three or more air paths may be provided. In that case, fans are provided to respectively correspond to air paths.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A power supply apparatus comprising:
   an air path extending longitudinally;
   a first wall in which an opening facing the air path is formed;
   a fan that blows air, through the opening, into the air path in a direction intersecting a longitudinal direction of the air path;
   a heat sink facing the air path; and
   a plurality of electronic components attached directly to the heat sink and arranged in the longitudinal direction, wherein the heat sink is spaced apart from the first wall in the direction intersecting the longitudinal direction of the air path.

2. The power supply apparatus according to claim 1, wherein the fan is arranged in an intermediate portion of the air path in the longitudinal direction, and two ends of the air path in the longitudinal direction each serve as an exit for air draft.

3. The power supply apparatus according to claim 1, wherein the heat sink is located between the air path and each of the plurality of electronic components.

4. The power supply apparatus according to claim 3, wherein the heat sink includes a plurality of fins each extending in the longitudinal direction, and the plurality of fins are aligned with each other with gaps therebetween.

5. The power supply apparatus according to claim 1, further comprising:

a second wall opposed to the first wall in a first direction that is orthogonal to the longitudinal direction; and
a pair of third walls opposed to each other in a second direction that is orthogonal to both the longitudinal direction and the first direction,
wherein the air path is surrounded by the first wall, the second wall, and the pair of third walls.

6. The power supply apparatus according claim 5, wherein one of the plurality of electronic component is arranged outside the air path.

7. The power supply apparatus according to claim 1, wherein one of the plurality of electronic components is a reactor or a transformer.

8. A power supply apparatus comprising:
an air path;
a first wall in which an opening facing the air path is formed;
a fan that includes a suction port and a discharge port and that blows air, through the opening, into the air path from the discharge port;
a plurality of electronic components that are cooled directly or indirectly by air passing through the air path; and
a plurality of walls additional to the first wall,
wherein the plurality of walls define a space adjacent to the air path with the first wall intervening between the space and the air path, the plurality of walls include a fan-opposed wall opposed to the suction port via the space, the fan-opposed wall is formed with an intake port portion for guiding air outside the space into the space, and the intake port portion is spaced apart, in an in-plane direction of the fan-opposed wall, from an area of the fan-opposed wall that is in front of the suction port.

9. The power supply apparatus according to claim 8, wherein the fan-opposed wall constitutes a casing cover for protecting the interior of the apparatus.

10. The power supply apparatus according to claim 9, wherein the air path extends longitudinally, the discharge port faces an intermediate portion of the air path in a longitudinal direction of the air path, the fan-opposed wall is parallel to the longitudinal direction, and the intake port portion is located in an area near an end of the fan-opposed wall in the longitudinal direction.

11. The power supply apparatus according to claim 10, wherein the intake port portion is located in a vertically intermediate portion of the fan-opposed wall or an area near a vertically upper portion of the fan-opposed wall.

12. The power supply apparatus according to claim 10, further comprising:
a front surface portion located at one end of the air path in the longitudinal direction; and
a rear surface portion located at the other end of the air path in the longitudinal direction,
wherein a ventilating hole portion in communication with the air path is formed in each of the front surface portion and the rear surface portion.

13. The power supply apparatus according to claim 10, further comprising:
a second wall opposed to the first wall in a first direction that is orthogonal to the longitudinal direction; and
a pair of third walls opposed to each other in a second direction that is orthogonal to both the longitudinal direction and the first direction,
wherein the air path is surrounded by the first wall, the second wall, and the pair of third walls, and the plurality of electronic components are arranged along the second wall.

14. The power supply apparatus according claim 13, wherein one of the plurality of electronic component is arranged outside the air path.

15. The power supply apparatus according claim 13, wherein one of the plurality of electronic components extends through one of the first wall, the second wall, and the pair of third walls.

16. The power supply apparatus according to claim 14, wherein one of the plurality of electronic components is a reactor or a transformer and include a coil portion exposed to the air path.

17. A power supply apparatus comprising:
a first air path;
a first fan that blows air into the first air path;
a second air path separated from the first air path;
a second fan that blows air into the second air path;
a plurality of electronic components that are each cooled by air passing through the first air path or air passing through the second air path;
a parting plate interposed between the first air path and the second air path;
a first wall in which a first opening facing the first air path is formed;
a second wall opposed to the first wall in a first direction that is orthogonal to the longitudinal direction;
a third wall in which a second opening facing the second air path is formed; and
a fourth wall opposed to the third wall in the first direction;
wherein the first air path extends longitudinally, and the second air path extends longitudinally in a longitudinal direction of the first air path, and
wherein two ends of both the first air path and the second air path in the longitudinal direction each serve as an exit for air draft, the first fan is located in an intermediate portion of the first air path in the longitudinal direction and blows air into the first air path through the first opening, and the second fan is located in an intermediate portion of the second air path in the longitudinal direction and blows air into the second air path through the second opening.

18. The power supply apparatus according to claim 17, wherein the second air path is located above the first air path, and the first fan and the second fan are variably controlled independently of each other.

19. The power supply apparatus according to claim 17, wherein both the first fan and the second fan discharge air in a direction intersecting the longitudinal direction.

20. The power supply apparatus according to claim 19, further comprising a fan-opposed wall opposed to both the first fan and the second fan,
wherein both the first fan and the second fan are arranged in a space adjacent to both the first air path and the second air path, an intake port portion for guiding air outside the space into the space is formed in the fan-opposed wall, and the intake port portion is located in an area displaced, in an in-plane direction of the fan-opposed wall, relative to both an area of the fan-opposed wall that is in front of the first fan and an area of the fan-opposed wall that is in front of the second fan.

21. The power supply apparatus according to claim 20, wherein the intake port portion is located in a vertically intermediate portion of the fan-opposed wall or an area near a vertically upper portion of the fan-opposed wall.

22. The power supply apparatus according to claim 20, further comprising:

a front surface portion located at one end of the first air path in the longitudinal direction and at one end of the second air path in the longitudinal direction; and a rear surface portion located at the other end of the first air path in the longitudinal direction and at the other end of the second air path in the longitudinal direction, wherein a ventilating hole portion is formed in each of the front surface portion and the rear surface portion.

23. The power supply apparatus according to claim 19, further comprising a heat sink, wherein one of the plurality of electronic components is a reactor or a transformer and include a coil portion exposed to the first air path, the heat sink is exposed to the second air path, and one of the plurality of electronic components extends through the fourth wall and are in contact with the heat sink.

24. The power supply apparatus according to claim 17, further comprising:

a first temperature sensor for detecting an internal temperature of the first air path; and a second temperature sensor for detecting an internal temperature of the second air path, wherein the first fan is controlled independently of the second fan in accordance with a signal from the first temperature sensor, and the second fan is controlled independently of the first fan in accordance with a signal from the second temperature sensor.

\* \* \* \* \*